US012086927B2

(12) United States Patent
Urnau Gotardo et al.

(10) Patent No.: US 12,086,927 B2
(45) Date of Patent: Sep. 10, 2024

(54) APPEARANCE CAPTURE UNDER MULTIPLE LIGHTING CONDITIONS

(71) Applicant: DISNEY ENTERPRISES, INC., Burbank, CA (US)

(72) Inventors: Paulo Fabiano Urnau Gotardo, Zurich (CH); Derek Edward Bradley, Zurich (CH); Jérémy Riviere, Zurich (CH)

(73) Assignee: DISNEY ENTERPRISES, INC., Burbank, CA (US)

( * ) Notice: Subject to any disclaimer, the term of this patent is extended or adjusted under 35 U.S.C. 154(b) by 385 days.

(21) Appl. No.: 17/506,520

(22) Filed: Oct. 20, 2021

(65) Prior Publication Data

US 2023/0124117 A1 Apr. 20, 2023

(51) Int. Cl.
*G06T 15/50* (2011.01)
*G06T 15/20* (2011.01)

(52) U.S. Cl.
CPC .......... *G06T 15/50* (2013.01); *G06T 15/205* (2013.01)

(58) Field of Classification Search
CPC ....... G06T 15/50; G06T 15/205; G06V 10/60; G06V 40/16; G06V 10/16; G06V 20/64; G01N 21/55
See application file for complete search history.

(56) References Cited

U.S. PATENT DOCUMENTS

| 8,670,606 | B2 | 3/2014 | Beeler et al. |
| 9,036,898 | B1 | 5/2015 | Beeler et al. |
| 9,883,167 | B2 | 1/2018 | Matthews et al. |
| 10,818,038 | B2 | 10/2020 | Beeler et al. |
| 2018/0007283 | A1* | 1/2018 | El Choubassi ...... G11B 27/005 |

OTHER PUBLICATIONS

Riviere et al., "Single-Shot High-Quality Facial Geometry and Skin Appearance Capture", ACM Trans. Graph., vol. 39, No. 4, Article 81, https://doi.org/10.1145/3386569.3392464, Jul. 2020, pp. 81:1-81:12.
Gotardo et al., "Practical Dynamic Facial Appearance Modeling and Acquisition", ACM Trans. Graph., vol. 37, No. 6, Article 232, https://doi.org/10.1145/3272127.3275073, Nov. 2018, pp. 232:1-232:13.

(Continued)

*Primary Examiner* — Daniel F Hajnik
(74) *Attorney, Agent, or Firm* — Squire Patton Boggs LLP; Sarah Mirza

(57) ABSTRACT

One embodiment of the present invention sets forth a technique for performing appearance capture. The technique includes receiving a first sequence of images of an object, wherein the first sequence of images includes a first set of images interleaved with a second set of images, and wherein the first set of images is captured based on illumination of the object using a first lighting pattern and the second set of images is captured based on illumination of the object using one or more lighting patterns that are different from the first lighting pattern. The technique also includes generating a first set of appearance parameters associated with the object based on a first inverse rendering associated with the first sequence of images.

20 Claims, 6 Drawing Sheets

(56) References Cited

OTHER PUBLICATIONS

Gotardo et al., "Photogeometric Scene Flow for High-Detail Dynamic 3D Reconstruction", 2015 IEEE International Conference on Computer Vision (ICCV), DOI: 10.1109/ICCV.2015.103, 2015, pp. 846-854.

Kang et al., "Learning Efficient Illumination Multiplexing for Joint Capture of Reflectance and Shape", ACM Trans. Graph., vol. 38, No. 6, Article 165, DOI: https://dl.acm.org/doi/pdf/10.1145/3355089.3356492, Nov. 2019, pp. 165:1-165:12.

Ghosh et al., "Multiview Face Capture using Polarized Spherical Gradient Illumination", ACM TOG, ACM Transactions on Graphics, vol. 30, No. 6, Article 129, https://doi.org/10.1145/2070781.2024163, Dec. 2011, pp. 129:1-129:10.

Guo et al., "The Relightables: Volumetric Performance Capture of Humans with Realistic Relighting", ACM Transactions on Graphics, vol. 38, No. 6, Article 217, https://doi.org/10.1145/3355089.3356571, Nov. 2019, pp. 217:1-217:19.

U.S. Appl. No. 16/920,344, filed Jul. 2, 2020, 44 pages.

\* cited by examiner

APPEARANCE CAPTURE UNDER MULTIPLE LIGHTING CONDITIONS

BACKGROUND

Field of the Various Embodiments

Embodiments of the present disclosure relate generally to computer science and computer graphics and, more specifically, to techniques for appearance capture under multiple lighting conditions.

Description of the Related Art

Realistic digital faces are required for various computer graphics and computer vision applications. For example, digital faces are oftentimes used in virtual scenes of film or television productions and in video games.

A digital face can be synthesized using three-dimensional (3D) geometry of the face and two-dimensional (2D) appearance maps indicating reflectance properties of the face. As used herein, "appearance" refers to reflectance properties characterizing how light interacts with materials before reaching a camera. Example reflectance properties include, without limitation, shininess (also referred to as "specular intensity") and the shape of a specular reflection lobe (also referred to as "roughness"), which are surface properties of skin models, as well as shading-free color (also referred to as "diffuse albedo"), which is mostly a subsurface property but can include contributions from the surface of skin as well. The reflectance properties of human skin, and more particularly the skin on a face, can vary due to skin type, tanning, blood flow caused by muscle activation or physiological effects, scarring, stretching, oiliness, and sweating, among other things.

Facial capture systems have been used to capture images of individual faces, which can in turn be used to obtain the 3D geometry and appearance maps needed to synthesize digital faces. In order to capture photorealistic faces, a typical facial capture system employs a specialized light stage and hundreds of lights that are used to capture numerous images of an individual face under multiple illumination conditions. These illumination conditions can be strobed in quick succession using the lights of the facial capture system to minimize the negative effects introduced by any movements of the individual.

One drawback of the above approach to capturing images of individual faces to create appearance maps is that facial movement during image capture across different illumination conditions can negatively impact the generation of 3D geometry and appearance maps from the resulting images. In addition, typical facial capture systems permit only static facial capture, not dynamic facial capture over a sequence of frames or images depicting different expressions in a facial performance.

As the foregoing illustrates, what is needed in the art are more effective techniques for capturing facial changes over time.

SUMMARY

One embodiment of the present invention sets forth a technique for performing appearance capture. The technique includes receiving a first sequence of images of an object, wherein the first sequence of images includes a first set of images interleaved with a second set of images, and wherein the first set of images is captured based on illumination of the object using a first lighting pattern and the second set of images is captured based on illumination of the object using one or more lighting patterns that are different from the first lighting pattern. The technique also includes generating a first set of appearance parameters associated with the object based on a first inverse rendering associated with the first sequence of images.

One technical advantage of the disclosed techniques relative to the prior art is that appearance parameters for the object can be generated from multiple images that include different types of lighting and detail. Accordingly, the appearance parameters are more accurate and detailed than appearance and/or geometry maps generated from capture of objects under a single illumination condition. The disclosed techniques also improve the granularity and accuracy of the appearance parameters over conventional appearance capture techniques that employ strobed lighting without interleaving images captured under illumination from one lighting pattern with images captured under illumination from other lighting patterns. Another technical advantage of the disclosed techniques is the ability to estimate appearance parameters for the object as the object assumes different positions, shapes, or deformations over time. These technical advantages provide one or more technological improvements over prior art approaches.

BRIEF DESCRIPTION OF THE DRAWINGS

The patent or application file contains at least one drawing executed in color. Copies of this patent or patent application publication with color drawings will be provided by the Office upon request and payment of the necessary fee.

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
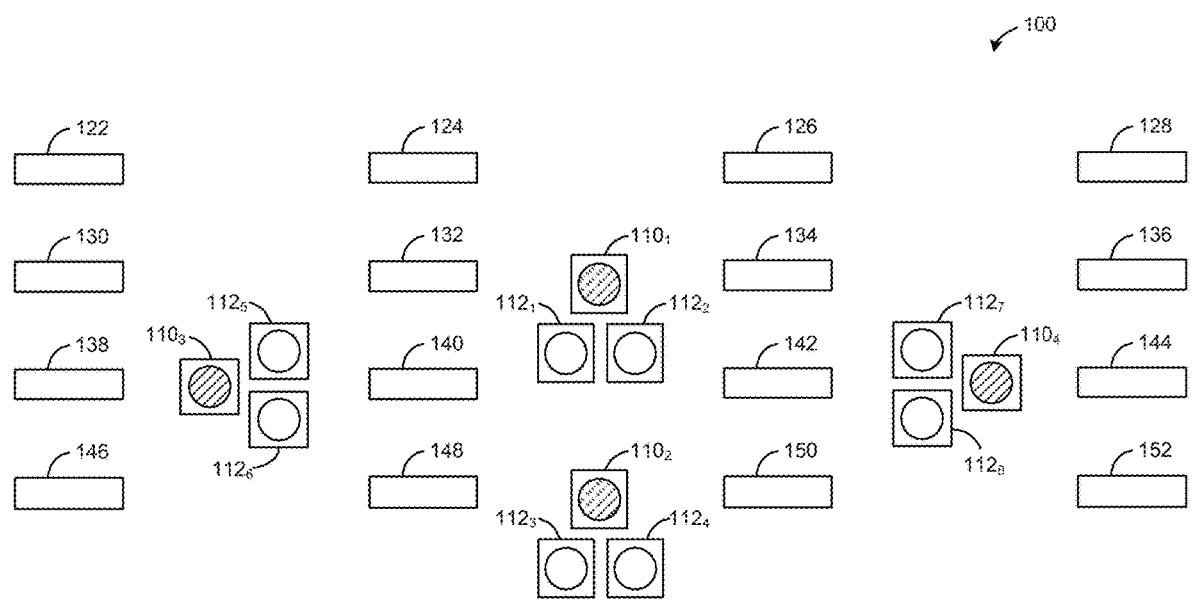
FIG. 1 illustrates the frontal view of a camera system for capturing faces of individuals, according to various embodiments.

FIG. 1 illustrates the frontal view of a camera system 100 for capturing faces of individuals, according to various embodiments. As shown, camera system 100 includes light sources 122, 124, 126, 128, 130, 132, 134, 136, 138, 140, 142, 144, 146, 148, 150, and 152. Camera system 100 also includes cross-polarized cameras $110_{1-4}$ (collectively referred to herein as "cross-polarized cameras 110" and individually referred to herein as "a cross-polarized camera 110"), and non-cross-polarized cameras $112_{1-8}$ (collectively referred to herein as "non-cross-polarized cameras 112" and individually referred to herein as "a non-cross-polarized camera 112").

In some embodiments, light sources 122, 124, 126, 128, 130, 132, 134, 136, 138, 140, 142, 144, 146, 148, 150, and 152 produce light having a particular polarization that is directed toward an object positioned in front of camera system 100 (e.g., an individual seated in front of camera system 100). This particular polarization can be any linear polarization (e.g., horizontal polarization or vertical polarization), circular polarization (e.g., left or right circular polarization), or elliptical polarization, and any technically feasible light sources can be used. For example, light sources 122, 124, 126, 128, 130, 132, 134, 136, 138, 140, 142, 144, 146, 148, 150, and 152 could include banks of light-emitting diodes (LEDs), with polarizing filters placed in front of the LEDs or studio flashes.

In some embodiments, each of light sources 122, 124, 126, 128, 130, 132, 134, 136, 138, 140, 142, 144, 146, 148, 150, and 152 can be independently switched on and off. For example, each of light sources 122, 124, 126, 128, 130, 132, 134, 136, 138, 140, 142, 144, 146, 148, 150, and 152 could be powered on and off to generate various lighting patterns and/or illumination conditions at different times. These lighting patterns and/or illumination conditions include substantially uniform lighting produced by turning on all light sources 122, 124, 126, 128, 130, 132, 134, 136, 138, 140, 142, 144, 146, 148, 150, and 152. The substantially uniform lighting includes light that lacks any "patterns" and is incident on an object from multiple directions. These lighting patterns and/or illumination conditions additionally include one or more non-uniform lighting patterns that are produced by turning on a subset (less than all) of light sources 122, 124, 126, 128, 130, 132, 134, 136, 138, 140, 142, 144, 146, 148, 150, and 152. Each non-uniform lighting pattern can be used to collect additional data related to the surface geometry and/or reflectance properties of the object, as described in further detail below.

Cross-polarized cameras 110 capture light having a polarization orthogonal to the particular polarization of light produced by light sources 122, 124, 126, 128, 130, 132, 134, 136, 138, 140, 142, 144, 146, 148, 150, and 152. For example, if light produced by light sources 122, 124, 126, 128, 130, 132, 134, 136, 138, 140, 142, 144, 146, 148, 150, and 152 is horizontally polarized, then cross-polarized cameras 110 may be configured to capture vertically polarized light, or vice versa. In such a case, cross-polarized cameras 110 could be digital cameras (e.g., digital single-lens reflex (DSLR) cameras) with linear polarizing filters that are oriented to pass light having an orthogonal polarization to the linear polarization of light produced by light sources 122, 124, 126, 128, 130, 132, 134, 136, 138, 140, 142, 144, 146, 148, 150, and 152. In another example, if light produced by light sources 122, 124, 126, 128, 130, 132, 134, 136, 138, 140, 142, 144, 146, 148, 150, and 152 is left-circularly polarized (or left-handed elliptically polarized), then cross-polarized cameras 110 may be configured to capture right-circularly polarized (or right-handed elliptically polarized) light, or vice versa. Cross-polarized cameras 110 are color cameras (as opposed to monochrome cameras) in some embodiments.

Non-cross-polarized cameras 112 capture light produced by light sources 122, 124, 126, 128, 130, 132, 134, 136, 138, 140, 142, 144, 146, 148, 150, and 152, including light that is not orthogonally polarized with respect to the particular polarization of light produced by light sources 122, 124, 126, 128, 130, 132, 134, 136, 138, 140, 142, 144, 146, 148, 150, and 152. For example, non-cross-polarized cameras 112 could include unpolarized cameras that capture all light produced by light sources 122, 124, 126, 128, 130, 132, 134, 136, 138, 140, 142, 144, 146, 148, 150, and 152. In another example, if light produced by light sources 122, 124, 126, 128, 130, 132, 134, 136, 138, 140, 142, 144, 146, 148, 150, and 152 is horizontally polarized, then non-cross-polarized cameras 112 could be parallel-polarized cameras that capture the horizontally polarized light. These parallel-polarized cameras could include parallel-polarized digital cameras (e.g., digital single-lens reflex (DSLR) cameras) with linear polarizing filters that are oriented to pass through horizontally polarized light from light sources 122, 124, 126, 128, 130, 132, 134, 136, 138, 140, 142, 144, 146, 148, 150, and 152. Although some examples are described herein with respect to parallel-polarized cameras, it should be understood that techniques disclosed herein are also applicable to other types of non-cross-polarized cameras with respect to light produced light sources. Non-cross-polarized cameras 112 can be monochrome (i.e., grayscale) cameras or color cameras.

Because specular reflection of light maintains the polarization of the incoming light, images captured by cross-polarized cameras 110 do not include specular highlights, whereas images captured by non-cross-polarized cameras 112 depict both specular and diffuse reflection. Images captured by cross-polarized cameras 110 can thus be used to determine appearance properties, such as diffuse albedo (RGB chromaticity of skin pigmentation) and the spatial extent of subsurface scattering of light. During subsurface scattering, the different wavelength components of incoming light bounce under the skin and are differently absorbed and reflected by skin pigments before bouncing back out, which gives human skin its color and "soft" appearance. On the other hand, images captured by non-cross-polarized cameras 112 can be used to determine complementary appearance properties including specular intensity and specular lobe. Unlike subsurface scattering, specular intensity as well as the shape of specular lobes represent highlighting caused by light reflecting on the surface of skin.

Because images concurrently captured by cross-polarized cameras 110 and non-cross-polarized cameras 112 can be used separately to determine the non-specular and specular properties of a face, only one shot (i.e., exposure) is required using cross-polarized cameras 110 and non-cross-polarized cameras 112 to generate different appearance maps of the face, such as a diffuse albedo map indicating shading-free color, a specular map indicating shininess, and a detailed geometry map indicating either normals or displacements that can be used to add or emboss a detailed three-dimensional (3D) geometry onto an initial, coarse 3D geometry of the face. However, some inaccuracy can be observed when rendering the face under an illumination condition that is different from the image capture condition. In some embodiments, multiple exposures can be captured by cross-polarized cameras 110 and non-cross-polarized cameras 112 over a short time period (e.g., a number of milliseconds) while the face is illuminated under different lighting patterns generated by light sources 122, 124, 126, 128, 130, 132, 134, 136, 138, 140, 142, 144, 146, 148, 150, and 152. As described in further detail below, these multiple exposures can then be used to improve the accuracy and perceived realism of face renderings under arbitrary lighting and the level of detail in the appearance maps.

Images captured by pairs of non-cross-polarized cameras 112 can be used to determine an initial 3D geometry of a face using triangulation techniques. Alternatively, the initial 3D geometry may be obtained in any technically feasible manner. For example, the initial 3D geometry could be received from another facial capture system that uses a different set of cameras, a depth camera, or some other scanning system. The initial 3D geometry and images captured by cross-polarized cameras 110 and non-cross-polarized cameras 112 can then be used to determine appearance maps, as well as a more detailed geometry map that additionally includes fine wrinkles and pores of a face, as discussed in greater detail below in conjunction with FIGS. 3-4. Although the appearance maps and detailed geometry map are described separately herein, it should be understood that the detailed geometry map can itself be considered an appearance map. In some embodiments, the appearance maps can include an albedo map, a specular intensity map (also known as the diffuse and specular albedo maps), and/or a specular roughness map that encodes the spatially varying shape of the specular lobe. Determining the appearance and detailed geometry maps is also referred to herein as determining appearance parameters, because the appearance and detailed geometry maps can be inserted, as parameter values, into a rendering equation that is used to render a face. In other embodiments, the appearance maps can include additional spatially varying parameters for modeling other reflectance properties such as the spatial extent of subsurface scattering.

As shown, cross-polarized cameras 110 and non-cross-polarized cameras 112 are arranged as triplets of cameras, each of which includes a pair of non-cross-polarized cameras 112 and one cross-polarized camera 110. In operation, one triplet of cameras can be used to capture a front of a face, another triplet of cameras can be used to capture a bottom of the face that includes the region under the chin as well as the chin itself and a region around the mouth, another triplet of cameras can be used to capture a left side of the face, and yet another triplet of cameras can be used to capture a right side of the face. Accordingly, cross-polarized cameras 110 and non-cross-polarized cameras 112 provide extensive coverage of a face.

Although four triplets of cross-polarized cameras 110 and non-cross-polarized cameras 112 are shown for illustrative purposes, other embodiments may employ one or more cross-polarized cameras and one or more non-cross-polarized cameras, arranged in any suitable manner, depending on the amount of facial coverage and specular information that is desired. More cross-polarized cameras, more non-cross-polarized cameras, or an equal number of cross-polarized cameras and non-cross-polarized cameras may be used in embodiments. In addition, some or all cross-polarized cameras 110 and non-cross-polarized cameras 112 can be arranged inside the boundaries formed by light sources, outside those boundaries, or in any other technically feasible manner (e.g., if the light sources do not form a boundary).

While diffuse color remains constant when captured by cameras at different vantage points, specular information can change when captured by cameras at different vantage points. For example, one cross-polarized camera 110 and one non-cross-polarized camera 112 could be used if partial facial coverage and a limited amount of specular information is acceptable (e.g., if only part of the face needs to be reconstructed). As another example, fewer than four triplets of cross-polarized cameras 110 and non-cross-polarized cameras 112 could be used if the cameras are wide-angle cameras. On the other hand, more than four triplets of cross-polarized cameras 110 and non-cross-polarized cameras 112 may be used to provide redundancy. In addition, cross-polarized cameras 110 and non-cross-polarized cameras 112 can be separated from one another, rather than placed together in triplets, so long as complementary image data is captured by the cross-polarized cameras and non-cross-polarized cameras. Alternatively, pairs of non-cross-polarized cameras 112 can be placed close to one other if stereo reconstruction is performed.

As with cross-polarized cameras 110 and non-cross-polarized cameras 112, the number, arrangement, and/or use of light sources in camera system 100 can be varied. For example, camera system 100 could include a larger or smaller number of light sources than is illustrated in FIG. 1, with additional light sources added at any location around (e.g., above or behind) the captured object. These light sources could be arranged in a rectangular grid, along a sphere or a portion of a sphere, along multiple parallel or perpendicular planes, and/or according to a different layout. In another example, each of the light sources could be selected or controlled to produce light of a certain intensity, color, color temperature, and/or another attribute.

Figure 2:
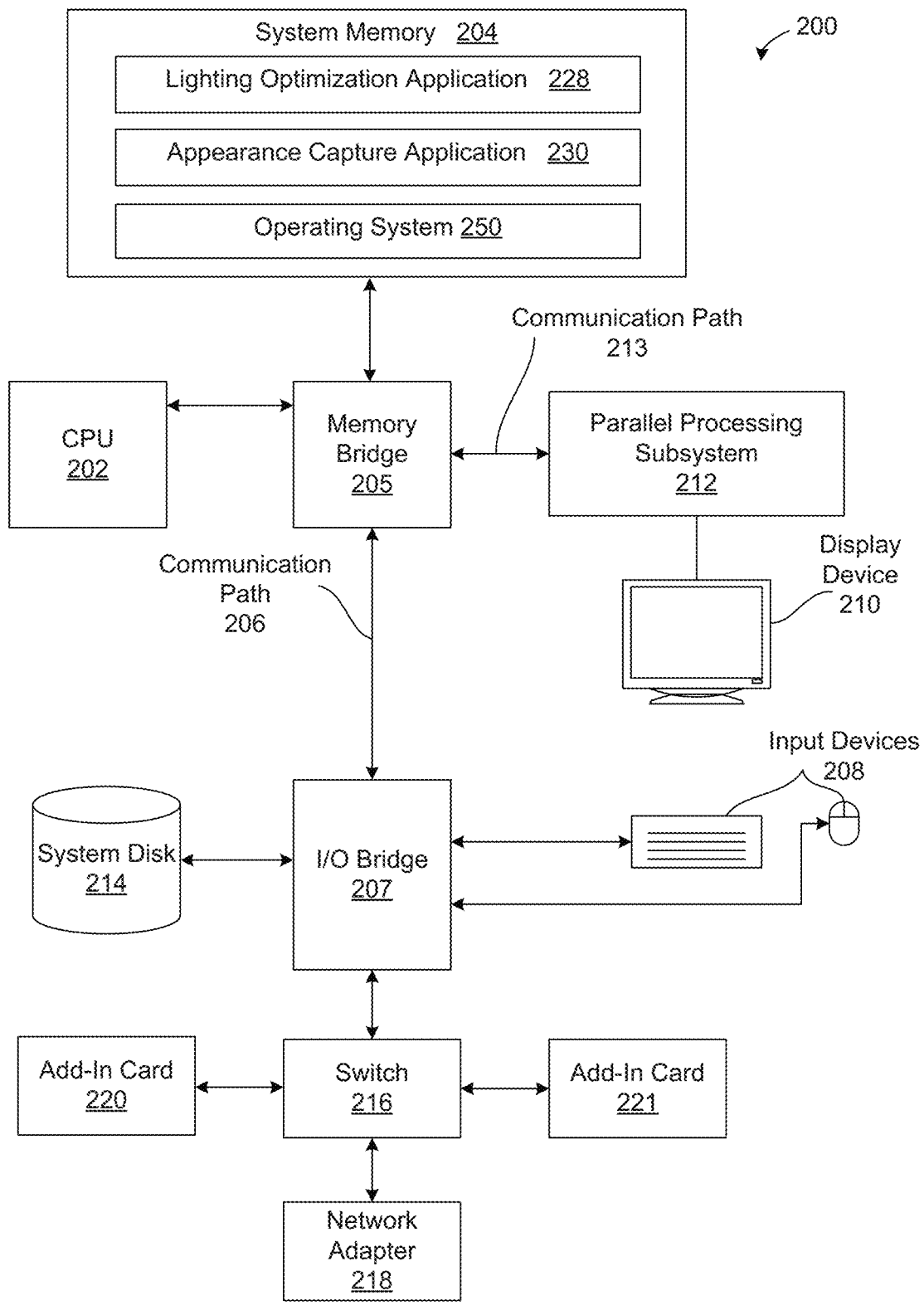
FIG. 2 illustrates a computer system configured to implement one or more aspects of the various embodiments.

FIG. 2 illustrates a computer system 200 configured to implement one or more aspects of the various embodiments. In some embodiments, computer system 200 is a machine or processing node operating in a data center, cluster, or cloud computing environment that provides scalable computing resources (optionally as a service) over a network.

As shown, computer system 200 includes, without limitation, a central processing unit (CPU) 202 and a system memory 204 coupled to one or more input devices 208, such as a keyboard, a mouse, a joystick, etc., and an I/O bridge 207 that is configured to forward the input information to the CPU 202 for processing via a communication path 206 and a memory bridge 205. A switch 216 is configured to provide connections between the I/O bridge 207 and other components of computer system 200, such as a network adapter 218 and various add-in cards 220 and 221. Although two add-in cards 220 and 221 are illustrated, in some embodiments, computer system 200 may not include any add-in cards or may only include a single add-in card, or the system 200 may include more than two add-in cards.

I/O bridge 207 is coupled to a system disk 214 that may be configured to store content, applications, and/or data for use by the CPU 202 and parallel processing subsystem 212. In some embodiments, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to the I/O bridge 207 as well.

In various embodiments, memory bridge 205 may be a Northbridge chip, and the I/O bridge 207 may be a Southbridge chip. In addition, communication paths 206 and 213, as well as other communication paths within the system 200, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to a display device 210 that may be any conventional cathode ray tube, liquid crystal display, light-emitting diode display, or the like. In such embodiments, parallel processing subsystem 212 incorporates circuitry optimized for graphics and video processing, including, for example, video output circuitry. Such circuitry may be incorporated across one or more parallel processing units (PPUs) included within parallel processing subsystem 212. In other embodiments, parallel processing subsystem 212 incorporates circuitry optimized for general purpose and/or compute processing. Again, such circuitry may be incorporated across one or more PPUs included within the parallel processing subsystem 212 that are configured to perform such general purpose and/or compute operations. In yet other embodiments, the one or more PPUs included within parallel processing subsystem 212 may be configured to perform graphics processing, general purpose processing, and compute processing operations. System memory 204 may include at least one device driver configured to manage the processing operations of the one or more PPUs within the parallel processing subsystem 212.

In various embodiments, parallel processing subsystem 212 may be or include a graphics processing unit (GPU). In some embodiments, the parallel processing subsystem 212 is integrated with one or more of the other elements of FIG. 2 to form a single system. For example, parallel processing subsystem 212 may be integrated with the CPU 202 and other connection circuitry on a single chip to form a system on chip (SoC).

In one embodiment, CPU 202 is the master processor of computer system 200, controlling and coordinating operations of other system components. In one embodiment, CPU 202 issues commands that control the operation of PPUs. In some embodiments, communication path 213 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. First, the functionality and components of the system can be distributed across one or more nodes of a distributed, virtual, and/or cloud computing system. Second, the connection topology, including the number and arrangement of bridges, the number of CPUs, and the number of parallel processing subsystems, may be modified as desired. For example, in some embodiments, system memory 204 could be connected to CPU 202 directly rather than through memory bridge 205, and other devices would communicate with system memory 204 via memory bridge 205 and CPU 202. In another example, parallel processing subsystem 212 may be connected to I/O bridge 207 or directly to CPU 202, rather than to memory bridge 205. In a third example, I/O bridge 207 and memory bridge 205 may be integrated into a single chip instead of existing as one or more discrete devices. Lastly, in certain embodiments, one or more components shown in FIG. 2 may not be present. For example, switch 216 could be eliminated, and network adapter 218 and add-in cards 220, 221 would connect directly to the I/O bridge 207.

In one or more embodiments, system memory 204 stores a lighting optimization application 228, an appearance capture application 230, and an operating system 250 on which lighting optimization application 228 and appearance capture application 230 run. Operating system 250 may be, e.g., Linux®, Microsoft Windows®, or macOS®.

In some embodiments, lighting optimization application 228 and appearance capture application 230 receive images of one or more faces (or other types of objects) captured via cross-polarized cameras 110 and non-cross-polarized cameras 112, and optionally an initial 3D geometry of the face(s). Given such inputs, lighting optimization application 228 identifies a combination of lighting patterns generated via light sources 122, 124, 126, 128, 130, 132, 134, 136, 138, 140, 142, 144, 146, 148, 150, and 152 that, when used to capture images with cross-polarized cameras 110 and/or non-cross-polarized cameras 112, result in the most accurate appearance and/or geometry maps of the face. A lighting pattern is defined as a subset of light sources that remain off and a subset of light sources that are turned on (optionally with a per-source intensity of up to 100%). Appearance capture application 230 subsequently uses images of the face (or a different face) that are captured by cross-polarized cameras 110 and non-cross-polarized cameras 112 under the lighting patterns identified by lighting optimization application 228 to simultaneously compute high-quality appearance and detailed geometry maps of the face. Lighting optimization application 228 and appearance capture application 230 are described in further detail below with respect to FIGS. 3-4.

Appearance Capture Under Multiple Lighting Conditions

Figure 3:
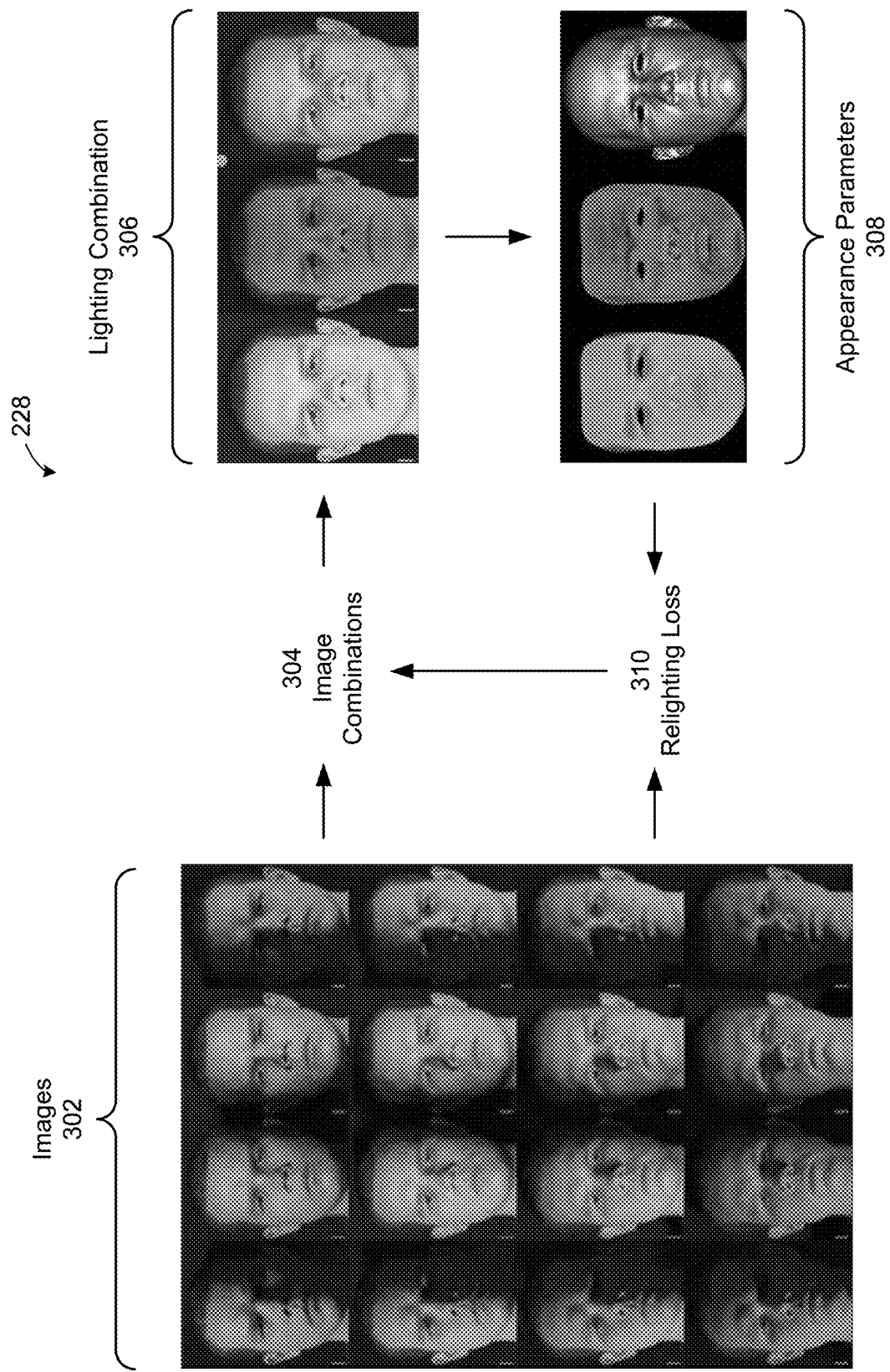
FIG. 3 illustrates the operation of the lighting optimization application of FIG. 2, according to various embodiments.

FIG. 3 illustrates the operation of lighting optimization application 228 of FIG. 2, according to various embodiments. As mentioned above, lighting optimization application 228 identifies a combination of lighting patterns 304 generated via light sources 122, 124, 126, 128, 130, 132, 134, 136, 138, 140, 142, 144, 146, 148, 150, and 152 that can be used with images 302 captured by cross-polarized cameras 110 and/or non-cross-polarized cameras 112 to produce accurate appearance and/or geometry maps of a face (or another object).

As shown in FIG. 3, images 302 are captured by cross-polarized cameras 110 and/or non-cross-polarized cameras 112 during illumination of the face by individual light sources (e.g., light sources 122, 124, 126, 128, 130, 132, 134, 136, 138, 140, 142, 144, 146, 148, 150, and/or 152 of FIG. 1). For example, each of images 302 could be captured by a camera while the face is held in a neutral expression and illuminated by a different light source 122, 124, 126, 128, 130, 132, 134, 136, 138, 140, 142, 144, 146, 148, 150, and 152. Thus, each image represents the facial reflectance information and geometric detail that can be captured when an individual light source is on and all other light sources are off.

In one or more embodiments, lighting optimization application 228 generates lighting patterns 304 from images 302. Each lighting pattern represents illumination of the face by a particular light source or combination of light sources that can be created by compositing or otherwise aggregating detail included in two or more images 302. For example, lighting optimization application 228 could combine (e.g., add, composite, stack, etc.) multiple images 302 to generate a lighting pattern that represents the facial reflectance information and geometric detail that can be captured when the corresponding light source(s) are on and remaining light sources are off. Thus, for 16 images 302 representing illumination of the face from 16 different light sources, lighting optimization application 228 could generate up to $2^{16}$, or 65,536, different lighting patterns 304, with each lighting pattern representing illumination of the face by a different combination of light sources.

Next, lighting optimization application 228 selects a subset of lighting patterns 304 as a lighting pattern combination 306 that represents a series of exposures of the face. For example, lighting optimization application 228 could select, for inclusion in lighting pattern combination 306, a lighting pattern (or image) that represents illumination of the face from all light sources. Lighting optimization application 228 could also add, to lighting pattern combination 306, two other lighting patterns 304 that represent illumination of the face from two other combinations of light sources. Thus, lighting pattern combination 306 could include three lighting patterns 304 that represent illumination of the face by three different combinations of light sources.

Lighting optimization application 228 uses lighting pattern combination 306 as input into an "inverse rendering" optimization procedure that generates appearance parameters 308 describing the appearance and/or geometry of the face. For example, lighting optimization application 228 could iteratively update appearance parameters 308 at increasingly fine granularities until the reproduction loss between one or more rendered images in lighting pattern combination 306 from appearance parameters 308 and the corresponding real lighting pattern(s) in lighting pattern combination 306 falls below a threshold. At the end of the optimization procedure, lighting optimization application 228 produces appearance parameters 308 that include (but are not limited to) a diffuse albedo, specular intensity, normal, and/or geometry map. Generating appearance parameters 308 via an inverse rendering optimization procedure is described in further detail below with respect to FIG. 4.

Lighting optimization application 228 then computes a relighting loss 310 between renderings of the face using appearance parameters 308 under lighting conditions that represent illumination of the face by individual light sources to the corresponding images 302 captured under illumination by the same light sources. For example, lighting optimization application 228 could use appearance parameters 308 to render the face under 16 different lighting conditions, with each lighting condition representing illumination of the face from a different light source. Lighting optimization application 228 could then compute relighting loss 310 as an L1 norm, L2 norm, or another aggregate measure of per-pixel dissimilarity between renderings of the face from appearance parameters 308 and images 302 captured under the same lighting conditions.

Lighting optimization application 228 repeats the process of generating a given lighting pattern combination 306, determining a set of appearance parameters 308 based on lighting pattern combination 306, and calculating relighting loss 310 between renderings generated from appearance parameters 308 and the corresponding images 302 until appearance parameters 308 and relighting loss 310 have been computed for all possible lighting pattern combinations associated with images 302 and/or lighting patterns 304. For example, multiple instances of lighting optimization application 228 could execute in parallel on a number of processing nodes (e.g., servers, virtual machines, cluster nodes, etc.) to compute appearance parameters 308 and relighting loss 310 for multiple lighting pattern combinations. Each lighting pattern combination 306 could include the same lighting pattern (or image) of the face under full lighting from all light sources, a first lighting pattern representing illumination of the face under a first lighting pattern generated by a first subset of the light sources, and a second lighting pattern representing illumination of the face under a second lighting pattern generated by a second subset of the light sources. Each lighting pattern combination 306 thus represents a unique combination of three lighting patterns. Accordingly, if two out of the three lighting patterns are selected and there are L light sources, lighting optimization application 228 would generate appearance parameters 308 and relighting loss 310 for $2^L \times (2^L-1)/2$ possible lighting pattern combinations.

In general, the search space of possible lighting pattern combinations can be affected by both the number of light sources and the number of lighting patterns in each lighting pattern combination 306. More specifically, with L light sources and N unique lighting patterns in each lighting pattern combination (excluding the lighting pattern representing full lighting from all light sources), lighting optimization application 228 can generate $2^L!/(N!(2^L-N!))$ possible lighting pattern combinations and evaluate appearance parameters 308 and relighting loss 310 for all of these lighting pattern combinations.

After appearance parameters 308 and relighting loss 310 have been determined for all possible lighting pattern combinations that include N unique lighting patterns, lighting optimization application 228 determines one or more lighting pattern combinations that produce the lowest relighting loss 310. Continuing with the above example, one or more processing nodes could collect appearance parameters 308 and relighting loss 310 for all lighting pattern combinations and rank the lighting pattern combinations by ascending or descending relighting loss 310. The processing node(s) could then use the ranking to identify the best lighting pattern combination 306, with the lowest relighting loss 310, and output lighting patterns in lighting pattern combination 306. The lighting patterns in lighting pattern combination 306 could then be used to capture additional images of the same face, a different face, and/or a different object and generate detailed appearance parameters for the face and/or object, as described in further detail below with respect to FIG. 4.

Lighting optimization application 228 optionally repeats the process for other faces and/or objects. For example, lighting optimization application 228 could identify a given lighting pattern combination 306 that produces the best appearance parameters 308 for each face that is captured. The same lighting pattern combination 306 could then be used to generate additional appearance parameters for the same face under varying facial expressions, as described in further detail below with respect to FIG. 4. In another example, lighting optimization application 228 could identify, for each of multiple faces, a "best-performing" lighting pattern combination 306 that results in the lowest relighting loss 310 for that particular face. Lighting optimization application 228 could then identify, for use with other faces, a "best-performing" lighting pattern combination 306 that most frequently occurs across the faces. Lighting optimization application 228 could also, or instead, generate an "average" lighting pattern combination 306 that includes the most frequently used light sources in the best-performing lighting pattern combinations and output the "average" lighting pattern combination for use with the other faces and/or facial expressions.

When a large number of light sources (e.g., hundreds) is used to illuminate the face, lighting optimization application 228 can reduce the search space associated with identifying the optimal lighting pattern combination 306 in a number of ways. First, lighting optimization application 228 can omit lighting patterns that fail to illuminate a region (e.g., top, bottom, side, etc.) of the face from inclusion in lighting pattern combination 306, thus reducing the number of lighting patterns 304 and/or lighting patterns that can be included in the lighting pattern combinations.

Lighting optimization application 228 can also, or instead, perform a coarse-to-fine search of lighting patterns and/or lighting pattern combination 306 that produce the lowest relighting loss 310. For example, lighting optimization application 228 could initially generate a first set of lighting pattern combinations that includes lighting patterns 304 that represent illumination under groupings of light sources (e.g., multiple contiguous light sources that are arranged in a square, rectangle, or another shape). After relighting loss 310 is calculated for each lighting pattern combination 306 in the first set of lighting pattern combinations, lighting optimization application 228 could identify, within the first set of lighting pattern combinations, one or more lighting pattern combinations with the lowest relighting loss 310. Lighting optimization application 228 could then generate a second set of lighting pattern combinations representing illumination of the face from various sub-groupings of light sources within the groupings of light sources associated with the identified lighting pattern combination(s) within the first set of lighting pattern combinations. Lighting optimization application 228 could also calculate relighting loss 310 for each lighting pattern combination in the second set of lighting pattern combinations and identify, within the second set of lighting pattern combinations, one or more of lighting pattern combinations with the lowest relighting loss 310. Lighting optimization application 228 could continue generating, filtering, and refining lighting pattern combinations that include progressively smaller sub-groupings of light sources until the lighting pattern combinations include illumination from individual light sources and/or a minimum group size is reached.

Lighting optimization application 228 can also, or instead, select individual lighting patterns 304 or groups of lighting patterns 304 for inclusion in the "best-performing" lighting pattern combination in a greedy or sequential manner. This greedy or sequential approach can be used to constrain the search space associated with lighting pattern combinations that have two or more lighting patterns 304 (i.e., whereN≥2).

For example, lighting optimization application 228 could start with a first set of lighting pattern combinations. Each lighting pattern combination in this first set could include one lighting pattern with full lighting from all light sources and a different lighting pattern formed by turning on a subset of light sources (i.e., so that N'=1 where N' represents the number of lighting patterns in each lighting pattern combination 306 within a given set of lighting pattern combinations). After generating appearance parameters 308 and evaluating relighting loss 310 for all lighting pattern combinations in the first set, lighting optimization application 228 could select the best-performing lighting pattern combination with the lowest relighting loss 310 from this first set of lighting pattern combinations. Next, lighting optimization application 228 could generate a second set of lighting pattern combinations by adding another lighting pattern to the best-performing lighting pattern combination (i.e., so that N'=2). Lighting optimization application 228 could generate appearance parameters 308 and determine relighting loss 310 for this second set of lighting pattern combinations and select the best-performing lighting pattern combination with the lowest relighting loss 310 from this second set of lighting pattern combinations. Lighting optimization application 228 could continue "growing" the best-performing lighting pattern combination 306 (i.e., increasing N') until the desired number of lighting patterns is reached and/or the reduction in relighting loss 310 between the best-performing lighting pattern combination of size N' and the best-performing lighting pattern combination of size N'+1 falls below a threshold.

In another example, lighting optimization application 228 could identify the best-performing lighting pattern combination 306 of size 3, which includes one lighting pattern representing full lighting from all light sources and two lighting patterns representing two other lighting patterns associated with the light sources. Lighting optimization application 228 could then identify the best-performing lighting pattern combination 306 of size 5, which includes the best-performing lighting pattern combination 306 of size 3 and two additional unique lighting patterns associated with the light sources. Thus, lighting optimization application 228 could continue adding two new lighting patterns to the best-performing lighting pattern combination 306 until the desired number of lighting patterns is reached and/or the reduction in relighting loss 310 between the best-performing lighting pattern combination of size N and the best-performing lighting pattern combination of size N+2 falls below a threshold.

Figure 4:
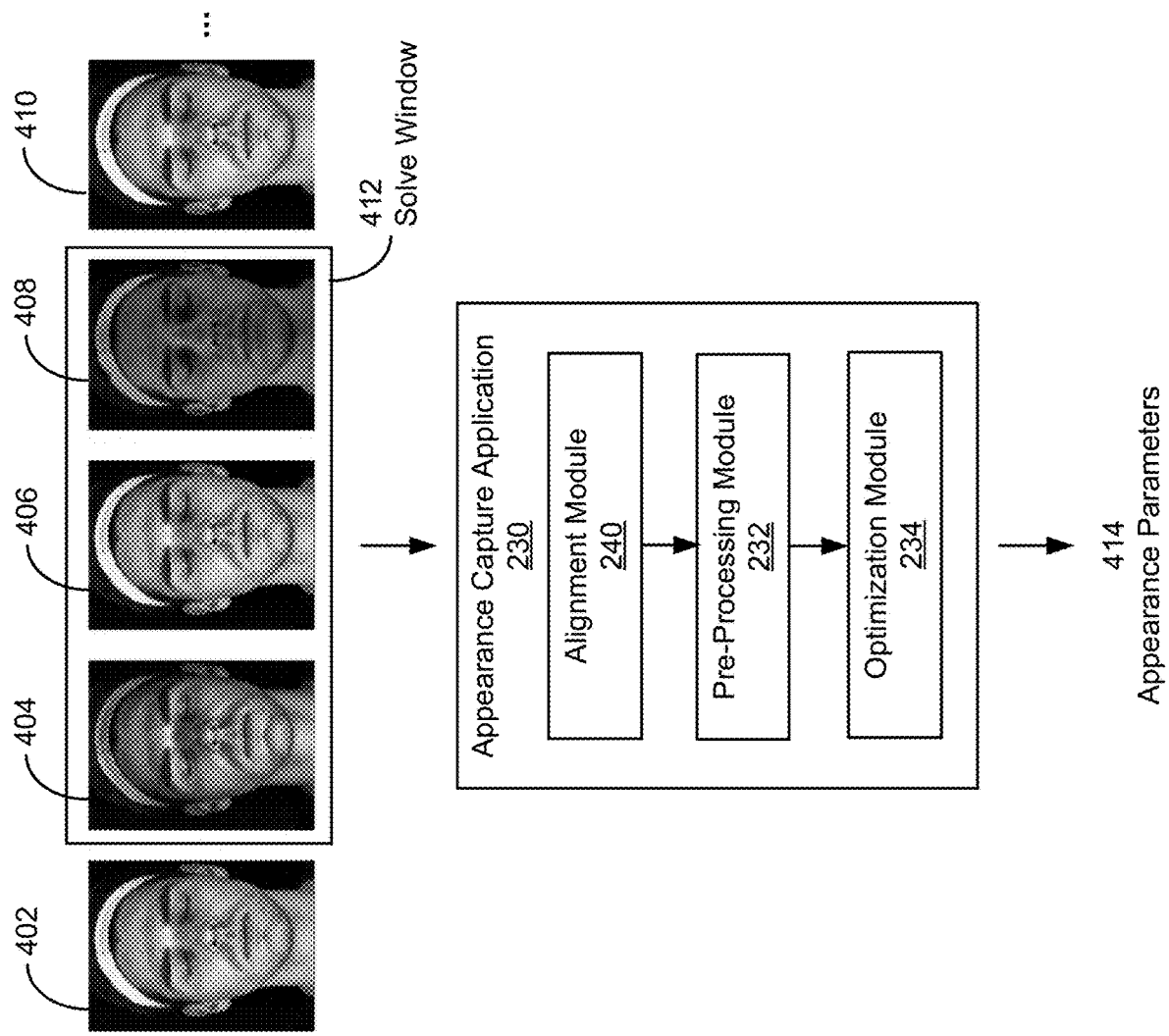
FIG. 4 is a more detailed illustration of the appearance capture application of FIG. 2, according to various embodiments.

FIG. 4 is a more detailed illustration of appearance capture application 230 of FIG. 2, according to various embodiments. As shown in FIG. 4, input into appearance capture application 230 includes a multi-view sequence of images 402, 404, 406, 408, and 410 of a face, as captured by one or more cross-polarized cameras 110 and/or non-cross-polarized cameras 112.

More specifically, the sequence of images 402, 404, 406, 408, and 410 includes images 402, 406, and 410 that are captured under full lighting conditions (i.e., all light sources on) interleaved with images 404 and 408 that are captured under other lighting patterns (i.e., a subset (less than all) of light sources on). For example, image 404 could be captured by a camera while the face is illuminated under a first lighting pattern in a "best-performing" lighting pattern combination identified by lighting optimization application 228, and image 408 could be captured by the camera while the face is illuminated under a second lighting pattern in the same lighting pattern combination identified by lighting optimization application 228.

In general, a sequence of images that is used as input into appearance capture application 230 includes images captured under full lighting conditions alternating with images captured under other lighting patterns associated with a lighting pattern combination identified by lighting optimization application 228. Thus, if the lighting pattern combination included one full lighting condition and N different lighting patterns, the sequence can include at least 2N images, where N odd-numbered (or even-numbered) images in the sequence are captured under the full lighting condition and the remaining N images in the sequence are captured under the other N lighting patterns in the lighting pattern combination.

Further, images 402, 404, 406, 408, and 410 in the sequence can be captured over a relatively short time period to minimize movement in the face across consecutive exposures. For example, images 402, 404, 406, 408, and 410 could be captured over a number of milliseconds by a high-speed camera, with each image captured while the face is illuminated with a corresponding lighting pattern generated by the light sources.

In one or more embodiments, appearance capture application 230 determines appearance parameters 414 associated with the face using three images 404, 406, and 408 that fall within a sliding solve window 412. Solve window 412 represents a set of images captured under lighting patterns in the best-performing lighting pattern combination. Thus, a sliding temporal solve window is used: a solve window that precedes solve window 412 can include image 404, image 402, and another image (not shown) that immediately precedes image 402 in the sequence and is captured under the same lighting conditions as image 408. A solve window that follows solve window 412 can include image 408, image 410, and another image (not shown) that immediately follows image 410 in the sequence and is captured under the same lighting conditions as image 404.

Additional images (not shown) in the sequence can also be captured under the corresponding lighting patterns while the face (or another object) is deformed or changed. For example, images of the face could be captured continuously while the face is held in various facial expressions (e.g., happy, sad, angry, surprised, afraid, disgusted, etc.). In another example, one or more sequences of images of an animal, plant, robot, doll, and/or another object can be captured while the object deforms or changes shape or size over time. In both examples, various subsequences of images that are captured under lighting patterns in a corresponding best-performing lighting pattern combination can be extracted under the corresponding solve windows and used as input into appearance capture application 230.

An alignment module 240 in appearance capture application 230 performs motion-based alignment of images 404, 406, and 408, in which motion compensation is applied to two of the three input images 404, 406, and 408 to align pixels representing various portions of the face in the two images with the pixels representing the same portions of the face in the remaining image. In some embodiments, alignment module 240 uses an optical flow estimation technique to compute motion vectors between pixels in image 406 and pixels in each of images 402 and 410. Alignment module 240 computes motion vectors between image 406 and image 404 by interpolating the motion vectors between pixels in image 406 and pixels in image 402. Alignment module 240 similarly computes motion vectors between image 406 and image 408 by interpolating the motion vectors between pixels in image 406 and pixels in image 410. Alignment module 240 then uses the computed motion vectors between images 406 and 404 and between images 406 and 408 to align pixels in images 404 and 408 with pixels representing the corresponding portions of the face in image 406. By using interpolation to determine motion vectors between images 406 and image 404 and between images 406 and 408 from motion vectors estimated between images 406 and 402 and between images 406 and 410, alignment module 240 averts issues with performing optical flow estimation between images with different pixel intensities (e.g., between images 406 and 404 and between images 406 and 408). In other embodiments, alignment module 240 uses optical flow estimation techniques to compute motion vectors directly between pixels in image 406 and pixels in each of images 402 and 410, but using image derivative values instead of the original RGB colors.

A pre-processing module 232 performs calibration and/or pre-processing related to the generation of appearance parameters 414 from images 404, 406, and 408. First, pre-processing module 232 receives or generates an initial geometry (not shown) of the face. This initial geometry can be generated in any technically feasible manner, including using known stereo techniques such as those disclosed in U.S. Pat. No. 9,036,898, entitled "High-Quality Passive Performance Capture Using Anchor Frames," and U.S. Pat. No. 8,670,606, entitled "System and Method for Calculating an Optimization for a Facial Reconstruction Based on Photometric and Surface Consistency," which are incorporated by reference herein in their entireties. Some stereo techniques output a two-dimensional (2D) representation of a 3D geometry, such as a displacement map defined in UV texture space. For example, a displacement map in UV texture space could be generated using automatic parameterization techniques, or by manually fitting a triangulated raw geometry to a template face mesh with a well-formed topology. This UV parametrization can make it easier to pool together data from different cameras (e.g., cross-polarized cameras 110 and non-cross-polarized cameras 112) during appearance estimation.

Next, pre-processing module 232 performs a calibration procedure to determine initial appearance maps that provide the starting point for optimization performed by an optimization module 234 in appearance capture application 230. In some embodiments, calibration is performed to ensure that the images captured by different cross-polarized cameras 110 and non-cross-polarized cameras 112 are compatible when used as optimization constraints. In some embodiments, pre-processing module 232 performs calibration using (1) one of cross-polarized cameras 110 as a calibration target for calibrating the other cross-polarized cameras 110, and (2) a rendering of the face captured by one of non-cross-polarized cameras 112 as the calibration target for calibrating the other non-cross-polarized cameras 112. Such a calibration, which is referred to herein as "self-calibration," differs from conventional calibration techniques that use a color chart as the calibration target. Further, this self-calibration can automatically compensate for light attenuation when passing through polarization filters, as well as mitigate the variability in responses of different cameras to incoming light. The outputs of self-calibration are color-exposure correction matrices for each camera and initial albedo maps associated with each of cross-polarized cameras 110 and non-cross-polarized cameras 112. Initial specular intensity and roughness maps are set to a globally estimated value for the face.

Prior to the self-calibration described above, positions of non-cross-polarized cameras 112 can be calibrated relative to each other to enable triangulation that is used to generate the initial geometry. For example, appearance capture application 230 could perform such a calibration if appearance capture application 230 generates the initial geometry from one or more images 404, 406, and 408 in solve window 412 (rather than receiving the initial geometry as input). Lighting calibration can also be performed by capturing an image of a mirror ball in front of the camera system 100 and using reflections from the mirror ball to estimate the environmental lighting used to render images of a face that are compared with images of the face captured by cross-polarized cameras 110 and non-cross-polarized cameras 112, discussed in greater detail below. For example, the environmental lighting can be estimated as an environment map encoding a spatial distribution of incoming light from light sources used to illuminate the face (e.g., light sources 122, 124, 126, 128, 130, 132, 134, 136, 138, 140, 142, 144, 146, 148, 150, and 152 of FIG. 1). In other embodiments, rather than looking inwards to a mirror ball, lighting calibration could be performed by stitching together panorama images captured with a fisheye lens from the point of view of a face looking outwards. In addition, the initial geometry can be used to ray-trace shadow maps that can be used during optimization performed by optimization module 234. The shadow maps indicate if particular light sources are visible by a particular point on a face. When performing appearance estimation, all of the light that arrives at each point on the face needs to be accumulated, but if a part/area of a light source is occluded (e.g., by the nose), as indicated by the shadow maps, then those directions are ignored.

In some embodiments, pre-processing module 232 also generates an initial detailed geometry map. For example, the initial detailed geometry map could be a displacement map with zeros indicating updates to the initial geometry. In some embodiments, pre-processing module 232 first computes, from the initial geometry, a vertex map and a normal map that serve as the starting points for determining the detailed geometry map as a displacement map during optimization. In such cases, updates to the initial geometry (represented by the vertex map in texture space) are constrained to be along normals of the initial geometry (represented by the initial normal map) in small deltas (represented by the displacement map). In addition, in some embodiments, pre-processing module 232 generates per-camera texture maps that include pixel colors from the input images 404, 406, and 408 and encode per-camera visibility. Further, in some embodiments, pre-processing module 232 can determine per-camera weights that downweight less reliable data based on high foreshortening of camera view and defocus from a shallow depth of view. As described in greater detail below, in some embodiments, the pre-computed geometry and shadow maps can be used in an inverse rendering to render a face, and the per-camera weights can be applied to the rendering error, where the inverse-rendered image is compared to a real captured image.

Given the initial appearance maps (and the other inputs described above), optimization module 234 performs non-linear least squares optimization, beginning with the initial appearance maps and the initial detailed geometry map generated by pre-processing module 232, to determine appearance parameters 414 that can be used to render images matching images 404, 406, and 408 in solve window 412. In some embodiments, appearance parameters 414 include one or more appearance maps and/or a detailed geometry map. During such an optimization, rendered images that include only color but not highlights (i.e., no specular information) are compared to images captured by cross-polarized cameras 110, while rendered images that include both color and highlights are compared to images captured by non-cross-polarized cameras 112. Such an optimization procedure is also referred to herein as "inverse rendering." As mentioned above, images captured by cross-polarized cameras 110 include color but not highlights, while images captured by non-cross-polarized cameras 112 include both color and highlights. Accordingly, images captured by cross-polarized cameras 110 are useful for determining appearance properties other than specular intensity and specular lobe (i.e., roughness), such as diffuse albedo, while images captured by non-cross-polarized cameras 112 are useful for determining appearance properties including specular intensity and specular lobe.

In some embodiments, optimization module 234 performs a coarse-to-fine optimization to determine optimized appearance and detailed geometry maps at increasingly highly resolutions, until an original resolution of the images captured by cross-polarized cameras 110 and non-cross-polarized cameras 112 is reached. Such a coarse-to-fine optimization permits various details of the appearance and detailed geometry maps to be determined at different resolutions.

In some embodiments, the optimization for computing appearance and detailed geometry maps can operate in the UV texture-space using initial geometry maps for the initial geometry, described above, and self-calibrated textures containing image data captured by cross-polarized cameras 110 and non-cross-polarized cameras 112. More formally, the output of optimization is a multi-channel map $\Theta(x_u, x_v)$ encoding per-texel RGB albedo, specular intensity and lobe size, and a displacement map representing detailed geometry. For each texel x, these parameters are encoded in a vector of unknowns $\Theta_x = \{\rho_r, \rho_g, \tau_b, \rho_s, \alpha, d\} \in \mathbb{R}^6$. When the lighting produced by the light sources is soft, estimating per-texel specular lobe sizes can be an ill-posed problem. In such cases, the lobe size a can be fixed as the size estimated during self-calibration $\alpha = \alpha_0$. In addition, spatial variation in skin roughness (e.g., due to skin stretching) is partially captured in the specular intensity and displacement maps that are computed.

To compute the optimal parameter map $\Theta$, optimization module 234 includes an auto-differentiable renderer that seeks to match input image data $I_c(x)$ (e.g., images 404, 406, and 408 in solve window 412) as closely as possible, i.e., to perform inverse rendering. In some embodiments, the matching can be achieved by minimizing the energy (loss) term:

$$E_{img}(\Theta_X) = \Sigma_x \Sigma_c W_c(x) \|I_c(x) - L_o(x, \omega_c)\|_2^2, \quad (1)$$

where the rendered texel colors $L_o(\cdot)$ are given by a bidirectional scattering-surface reflectance distribution function (BSSRDF), and $W_c$ are precomputed per-camera weight maps, described above, that can be used to provide a measure of confidence in the data due to defocus and view foreshortening.

In some embodiments, the BSSRDF is of the form $$L_o(x_o, \omega_o) = \Sigma_A \Sigma_\Omega S(x_o, \omega_o, x_i, \omega_i) L_i(x_i, \omega_i)(n_i^T \omega_i) \Delta \omega_i A_i \quad (2)$$

for unoccluded directions $\omega_i \in \Omega$ with solid angle $\Delta \omega_i$ and nearby patches $x_i \in A$ with area $\Delta A_i$, where $x_i$ is the position of a surface patch with normal $n_i$, and $L_i(x_i, \omega_i)$ is the incident light from direction $\omega_i$. In the BSSRDF of equation (2), $S(x_o, \omega_o, x_i, \omega_i)$ includes two components that define the surface (specular) and subsurface (diffuse) contributions to reflected light:

$$S(x_o, \omega_o, x_i, \omega_i) = \delta_{ij} S_r(x_o, \omega_o, \omega_i) + S_d(x_o, \omega_o, x_i, \omega_i), \quad (3)$$

where the Kronecker delta $\delta_{ij} = 1$ if $x_i = x_o$. When rendering cross-polarized views, the surface reflectance in equation (3) can be modeled as $S_r(x_o, \omega_o, \omega_i) = 0$.

For parallel-polarized views, the surface reflectance in equation (3) can be modeled using the Cook-Torrance bidirectional reflectance distribution function (BRDF):

$$S_r(x_o, \omega_o, \omega_i) = \rho_s(x_o) \frac{D(\omega_o, \omega_i, n_o, \alpha) G(\omega_o, \omega_i) F(\eta, \omega_o, \omega_i)}{4(n_o^T \omega_i)(n_o^T \omega_o)}, \quad (4)$$

which is modulated by the spatially varying specular intensity parameter $\rho_s$ that captures variability in skin reflectance due to, e.g., surface oiliness. In equation (3), G is the standard geometry attenuation term, F denotes the Fresnel curve, and the index of refraction can be fixed at η=1.4. In some embodiments, the Fresnel curve F is used for parallel-polarized light, rather than unpolarized light that the Fresnel curve is typically used for, when horizontal polarizers are used on light sources to produce predominantly parallel polarized reflection on a face along the equatorial directions. The distribution term D in equation (5) can be $D(\bullet)=\alpha D_{12}(\bullet)+(1-\alpha)D_{48}(\bullet)$, which is a linear combination of two Blinn-Phong basis lobes with exponents 12 and 48.

Returning to equation (3), the diffuse reflection term $S_d$, which accounts for subsurface scattering and absorption of light for the given color channel wavelength $\lambda$, can be computed as $$S_d(\cdot) = \frac{1}{\pi} F_t(x_o, \omega_o) \rho_\lambda(x_o) R_\lambda(\|x_o - x_i\|_2) \rho_\lambda(x_i) F_t(x_i, \omega_i), \quad (5)$$

where $F_t$ is the Fresnel transmittance, $\rho_\lambda$ is the (red, green, or blue) spatially varying albedo, and $R_\lambda(r)$ is a sum-of-Gaussians diffusion profile. In some embodiments, optimization module 234 uses diffusion profiles that are relative to the typical diffusion observed for a blue wavelength. In addition, per-channel Gaussian weights can be fixed as computed to approximate a three-layer skin model.

As described, subsurface scattering needs to be accounted for to avoid blurry normal and albedo estimates with attenuated high-frequency detail. By accounting for subsurface scattering, the albedo and normal maps will have sharper details that are blurred during rendering to look like skin. To improve the level of recovered surface detail, the approach described above focuses on data from surface (specular) reflectance. As described, specular reflection maintains light polarization, so non-cross-polarized cameras 112 filter out half of the diffuse reflection and effectively increase the specular-to-diffuse reflection ratio. However, the specular signal under a single illumination condition may not be enough to fully disambiguate normal estimation. The fact that subsurface scattering is significantly lower in the blue image channel can be leveraged to solve this problem by estimating fine-scale detail using predominantly specular and blue-diffuse constraints.

In some embodiments, optimization module 234 uses diffusion profiles that are relative to the typical diffusion observed for a blue wavelength, as described above. To further constrain the estimation of normals, integrability (zero curl) can be enforced as a hard constraint in the geometry model. In such a case, the refined normal field is parameterized in terms of a displacement map d(u,v) that is optimized for from the outset and can be trivially applied to emboss fine-detailed geometry onto an initial fitted template face mesh that is used as the initial geometry.

More formally, given the input vertex and normal maps of the template face mesh, let $\hat{n}$, $\hat{t}_u$, and $\hat{t}_v$ denote a texel's unit normal and tangent vectors (computed by simple finite differences). In addition, let $\hat{s}_u$ and $\hat{s}_v$ be the original lengths of the tangent vectors encoding texel size. Then, after applying the high-level displacement map d(u,v), the non-unit normal of the new, refined mesh can be expressed from the new, non-unit tangents as $$n = (\hat{s}_u \hat{t}_u + d_u \hat{n}) \times (\hat{s}_v \hat{t}_v + d_v \hat{n}) \quad (6)$$

$$= [\hat{t}_u \ \hat{t}_v \ \hat{n}] \begin{bmatrix} \hat{s}_v & 0 & 0 \\ 0 & \hat{s}_v & 0 \\ 0 & 0 & \hat{s}_u \hat{s}_v \end{bmatrix} \begin{bmatrix} -d_u \\ -d_v \\ 1 \end{bmatrix}, \quad (7)$$

where $d_u$ and $d_v$ are the partial derivatives of d(u,v) computed via finite differencing. The simple form in equation (6) is achieved by leveraging the fact that a triangle in the initial template mesh (i.e., the initial geometry) spans multiple texels in its normal map, resulting in locally constant $\hat{n}$. In addition, equation (6) properly accounts for texel size, which improves scaling of constraints and allows for optimization in a coarse-to-fine, multi-resolution manner for better convergence.

Returning to the energy term of equation (1) that is minimized to match rendered images to input image data $I_c(x)$ as closely as possible, the data terms in equation (1) may not be sufficient to completely constrain all parameters of all texels. In some embodiments, optimization module 234 can use additional regularization constraints to disambiguate parameter estimation in small regions of the face. In such cases, the overall energy term minimized during optimization can be $$\min_\Theta E_{img}(\Theta_X) + \lambda_1 \|d - d_0\|_F^2 + \lambda_2 \|\nabla d\|_F^2 + \lambda_3 \|\rho_s - \rho_{s0}\|_F^2 + \lambda_4 \|\nabla \rho_s\|_F^2. \quad (8)$$

In equation (8), a detailed displacement map is weakly constrained to be close to the initial geometry map, $d_0(u,v)$, as the detailed displacement map only updates mid- and high-frequency geometry components of the template face mesh ($\lambda_1=0.03$). A small 3×3 Laplacian operator can also be applied to ensure smoothness in underconstrained regions of the face ($\lambda_2=0.02$). Similarly, in equation (8), specular intensity is regularized towards the global, self-calibrated value in $\rho_{s0}$ in underconstrained regions where specular reflection is very weak ($\lambda_3=0.03$), which can include extreme sides of the face where there is no illumination from behind, underneath the jaw, and in concave regions where multiple indirect bounces of light are not accounted for. Initially, a strong Laplacian operator can be applied to smooth the specular intensity map ($\lambda_4=0.03$), which forces fine-detailed surface geometry to be represented mostly by the displacement map. Upon convergence during optimization, the geometry map can be fixed and optimization continued with disabled Laplacians, allowing specular intensity to also model sharp specular reflection occlusion effects that were not explained by the optimized geometry. In addition, to compute displacement maps with stronger mid-frequency (e.g., deeper skin wrinkles and creases, larger moles, etc.), appearance and geometry optimization can be performed in the coarse-to-fine manner described above, with results first computed at lower resolutions and then used to initialize optimization at higher resolutions. As described, the coarse-to-fine optimization permits different details to be determined at different resolutions. At each increasing resolution, the appearance and detailed geometry maps are closer to final, optimized maps, and the optimization converges faster due to the initialization using the appearance and detailed geometry maps determined at a previous resolution. For example, optimization could begin at 2K×2K resolution and end with 4K or 8K maps, using a 2× upsampling factor that doubles the resolution at every iteration of the coarse-to-fine optimization. In some embodiments, optimization module 234 can use a non-linear ceres solver to during the optimization.

As described above, calibration is required before optimization module 234 computes appearance and geometry refinement to account for differences in color space (exposure, black level) and polarization filter attenuation among cross-polarized cameras 110 and non-cross-polarized cameras 112. In some embodiments, pre-processing module 232 performs calibration using (1) one of cross-polarized cameras 110 as a calibration target for calibrating the other cross-polarized cameras 110, and (2) a rendering of the face captured by one of non-cross-polarized cameras 112 as the calibration target for calibrating the other non-cross-polarized cameras 112.

Color calibration using a standard color chart can be misled by specular reflection when both view and light directions are at an oblique angle. In addition, properly measuring the per-camera attenuation of image intensity due to the use of polarization filters can be difficult and laborious. As described, some embodiments employ automated self-calibration, using the captured face itself along with renderings as the calibration target, to facilitate use of camera system 100. In such cases, only one of cross-polarized cameras 110 needs to be color calibrated towards a color chart to provide a reference color space that will be matched by the other cross-polarized cameras 110. For example, one cross-polarized camera 110 in front of the face could be taken as the reference, and pre-processing module 232 could calibrate each of the other cross-polarized cameras 110 to match the colors of the frontal cross-polarized camera 110, by estimating a 3×4 affine color matrix in the least-squares sense. The other eight cameras 110, which are parallel polarized, may exhibit strongly view-dependent specular reflection. To calibrate non-cross-polarized cameras 112, pre-processing module 232 can generate an initial rendering based on the appearance model described above, and use the rendering as the calibration target. Doing so ensures that each of non-cross-polarized cameras 112 agrees with the appearance model as closely as possible. More specifically, given the initial geometry of a template face mesh, for each of the parallel-polarized cameras c, pre-processing module 232 can render two specular reflection images, $S_{c_1}(x)$ and $S_{c_2}(x)$, one for each of the specular basis lobes in the BRDF described above, using a diffuse term $I_{xp}(x)$ that is the image of the closest cross-polarized camera. In such a case, the self-calibration procedure for each parallel-polarized camera image $I_c(x)$ can estimate a camera color matrix $M_c$ satisfying $$M_c \begin{bmatrix} I_c(x) \\ 1 \end{bmatrix} \approx \begin{bmatrix} S_{c_1}(x) & S_{c_2}(x) & I_{xp}(x) \end{bmatrix} \begin{bmatrix} w_1 \\ w_2 \\ 1 \end{bmatrix}, \forall c, \forall x. \quad (9)$$

In equation (9), the specular weights $w_1 > 0$ and $w_2 > 0$ are related to the BRDF parameters in equation (3). In particular, the specular intensity is $\rho_s = w_1 + w_2$ and the specular lobe size is $\alpha = w_1/(w_1 + w_2)$. As described, the weights $w_1$ and $w_2$, which are not initially known, can be (globally) estimated in addition to the eight matrices $M_c$ via an alternated least squares technique. In such cases, the weights $w_1$ and $w_2$ can be initialized using known measurements of facial skin reflectance. In addition, as a by-product of self-calibration, pre-processing module 232 can compute global estimates $\rho_{s0}$ and $\alpha_0$ that can be used to regularize per-texel estimates in the optimization performed by optimization module 234, described above.

In one or more embodiments, appearance parameters 414 outputted by optimization module 234 include a diffuse albedo map, a specular intensity map, a specular lobe (roughness) map, and a detailed geometry map that is a displacement map. These maps can be used to render images of a face. Although described herein primarily with respect to particular appearance and detailed geometry maps as reference examples, in other embodiments, any technically feasible appearance parameters 414, such as global or spatially varying specular roughness maps, can be generated using techniques disclosed herein.

As mentioned above, different numbers of images or lighting patterns can be used to perform appearance capture of a face (or another type of object). For example, a lighting pattern combination for a given object could include six different lighting patterns under which the object is to be illuminated. These lighting patterns could be "flashed" over a sequence of at least 10 images of the object, with every odd-numbered image captured under full lighting by all light sources and every even-numbered image captured under one of the remaining five lighting patterns. This sequence of images would fall under the same solve window and be used by appearance capture application 230 to perform alignment of the images and compute appearance parameters 414 for the object, as captured in the five even-numbered images of the object illuminated under five different lighting patterns and one image of the object illuminated under full lighting (e.g., an image that occurs at or near the middle of the sequence). In a second example, a lighting pattern combination of five lighting patterns could be emitted over six images, where the first and fourth images are captured under full lighting by all light sources, and the second, third, fifth, and sixth images are captured under the remaining four lighting patterns. Thus, full lighting is used with every third image in the second example and with every other image in the first example. In a third example, a sequence of images of an object could include a repeating pattern of multiple consecutive images of the object captured under full lighting by all light sources, followed by a single image of the object under a different lighting pattern. In this example, full lighting is used to capture a majority of images, and one or more lighting patterns that do not involve full lighting are used to capture a minority of images. In general, the number of lighting patterns in a lighting pattern combination for an object, the frequency of images captured under full lighting conditions for the object, and/or the particular sequence or pattern of illumination used to capture images of the object can be selected to accommodate variations in camera speed (e.g., due to sensors, lenses, exposure constraints, etc.), the number of lighting patterns needed to collect sufficient appearance data for the object, and/or the rate at which the facial expression changes.

Figure 5:
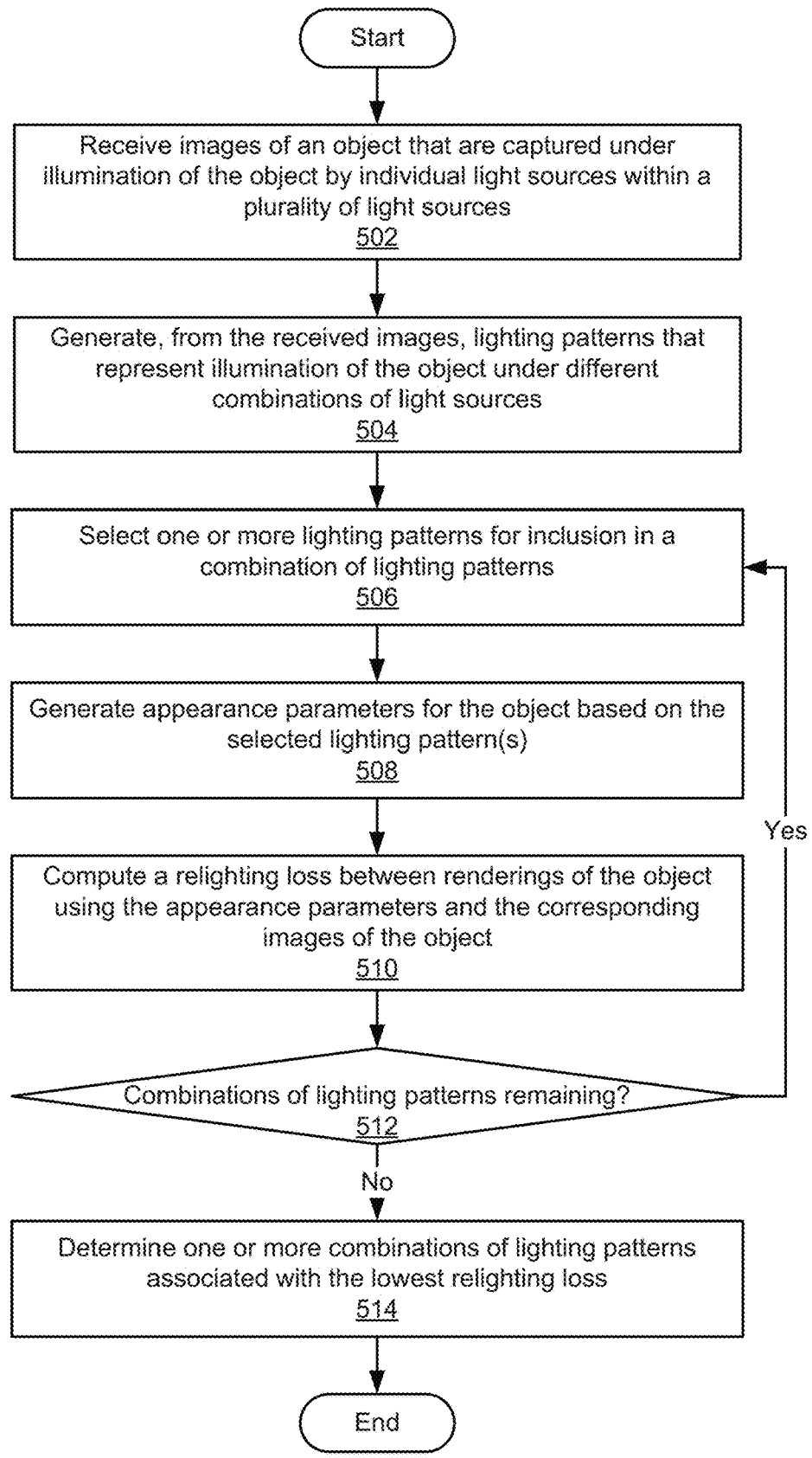
FIG. 5 is a flow diagram of method steps for optimizing lighting conditions for appearance capture, according to various embodiments.

FIG. 5 is a flow diagram of method steps for optimizing lighting conditions for appearance capture, according to various embodiments. Although the method steps are described in conjunction with the systems of FIGS. 1-4, persons skilled in the art will understand that any system configured to perform the method steps in any order falls within the scope of the present disclosure.

As shown, in step 502, lighting optimization application 228 receives images of an object that are captured based on illumination of the object by individual light sources within a plurality of light sources. For example, lighting optimization application 228 could receive images of a face that is held in a neutral (or another type of) facial expression. Each image is captured while the face is illuminated using a different light source (or optionally, while the face is illuminated using a different grouping of light sources).

Next, in step 504, lighting optimization application 228 generates, from the received images, lighting patterns that represent illumination of the object under different combinations of light sources. For example, lighting optimization application 228 could add, composite, "stack," or otherwise combine two or more images received in step 502 into a single "lighting pattern" that represents illumination of the object under two or more light sources. Lighting optimization application 228 could generate other lighting patterns to represent illumination of the object under other light sources or combinations of light sources.

In step 506, lighting optimization application 228 selects one or more lighting patterns for inclusion in a combination of lighting patterns. For example, lighting optimization application 228 could select a lighting pattern representing full lighting from all available light sources and one or more lighting patterns representing lighting from a subset of available light sources for inclusion in the combination of lighting patterns.

In step 508, lighting optimization application 228 generates appearance parameters for the object based on the selected lighting pattern(s). For example, lighting optimization application 228 could generate a geometry map, diffuse albedo map, specular intensity map, specular roughness map, and/or other appearance parameters via an inverse rendering technique and the selected lighting pattern(s).

In step 510, lighting optimization application 228 computes a relighting loss between renderings of the object using the appearance parameters and the corresponding images of the object. For example, lighting optimization application 228 could use the appearance parameters generated in step 508 to render images of the object under the same viewpoints and lighting conditions corresponding to illumination by individual light sources. Lighting optimization application 228 could then calculate the relighting loss as an L1 norm, L2 norm, or another aggregate measure of per-pixel distances between the rendered images and images captured under the same lighting conditions (e.g., images received in step 502).

In step 512, lighting optimization application 228 determines if there are additional combinations of lighting patterns remaining to be analyzed using steps 506, 508, and 510. For example, lighting optimization application 228 could determine that additional combinations of lighting patterns remain if lighting optimization application 228 has not iterated over all possible combinations that include a lighting pattern representing full lighting from all available light sources and one or more lighting patterns representing lighting from a subset of available light sources (or another combination of lighting patterns associated with the light sources). While additional combinations of lighting patterns remain, lighting optimization application 228 repeats steps 506, 508, and 510 to generate appearance parameters and determine a relighting loss for each combination of lighting patterns.

After lighting optimization application 228 has generated appearance parameters and computed the relighting loss for all combinations of lighting patterns, in step 514, lighting optimization application 228 determines one or more combinations of lighting patterns associated with the lowest relighting loss. For example, lighting optimization application 228 could rank the combinations of lighting patterns by ascending relighting loss and select one or more highest-ranked combinations of lighting patterns. Lighting optimization application 228 could also, or instead, select a variable number of combinations of lighting patterns with relighting losses that fall below a numeric, percentile, or another threshold. Lighting optimization application 228 could then output the selected combination(s) for subsequent use in capturing images of the same object and/or a different object. Lighting optimization application 228 could also, or instead, generate or output a sequence of lighting patterns that includes all lighting patterns in a given combination of lighting patterns selected in step 514. The sequence of lighting patterns could include full lighting from all available light sources alternating with one or more other lighting patterns in the combination. The sequence of lighting patterns could also, or instead, include an extended period under full lighting by all light sources, followed by a shorter period under a different lighting pattern. The sequence of lighting patterns could also, or instead, include consecutive lighting patterns that are different and do not include full lighting, followed by a single "instance" of full lighting.

As mentioned above, lighting optimization application 228 can use various techniques to reduce the number of iterations of steps 506, 508, and 510 required to identify the combination(s) of lighting patterns with the lowest relighting loss. For example, lighting optimization application 228 could perform a coarse-to-fine search of lighting patterns that minimize the relighting loss. During this search, lighting optimization application 228 could generate a first set of combinations of lighting patterns that include lighting patterns formed from larger groups of adjacent light sources. When a given lighting pattern or combination of lighting patterns results in a low relighting loss (e.g., compared with a threshold or other lighting patterns or combinations of lighting patterns), lighting optimization application 228 could generate additional sets of combinations of lighting patterns that include lighting patterns formed from smaller groups of light sources within the larger groups associated with the first set of combinations of lighting patterns. Lighting optimization application 228 could repeat the process until a minimum group size is reached and/or the combinations of lighting patterns include lighting patterns formed from individual light sources.

In another example, lighting optimization application 228 could add lighting patterns to the "best-performing" combination of lighting patterns in a sequential "greedy" manner. In this example, lighting optimization application 228 would perform a first round of steps 506, 508, 510, 512, and 514 to identify one or more combinations of lighting patterns with X lighting patterns that have the lowest relighting loss. Lighting optimization application 228 would then perform a second round of steps 506, 508, 510, 512, and 514 to select combinations of lighting patterns of size X+Y that have the lowest relighting loss. In this second round, X lighting patterns in the combinations of lighting patterns would be selected in the first round, and Y new lighting patterns would be added to the combinations of lighting patterns. Lighting optimization application 228 could optionally perform additional rounds of steps 506, 508, 510, 512, and 514 to add additional lighting patterns to the combinations of lighting patterns until the combinations of lighting patterns identified in step 514 reach a threshold size and/or the decrease in relighting loss between the combination(s) of lighting patterns identified in one round of steps 506, 508, 510, 512, and 514 and the combination(s) of lighting patterns identified in the next round of steps 506, 508, 510, 512, and 514 falls below a threshold.

Figure 6:
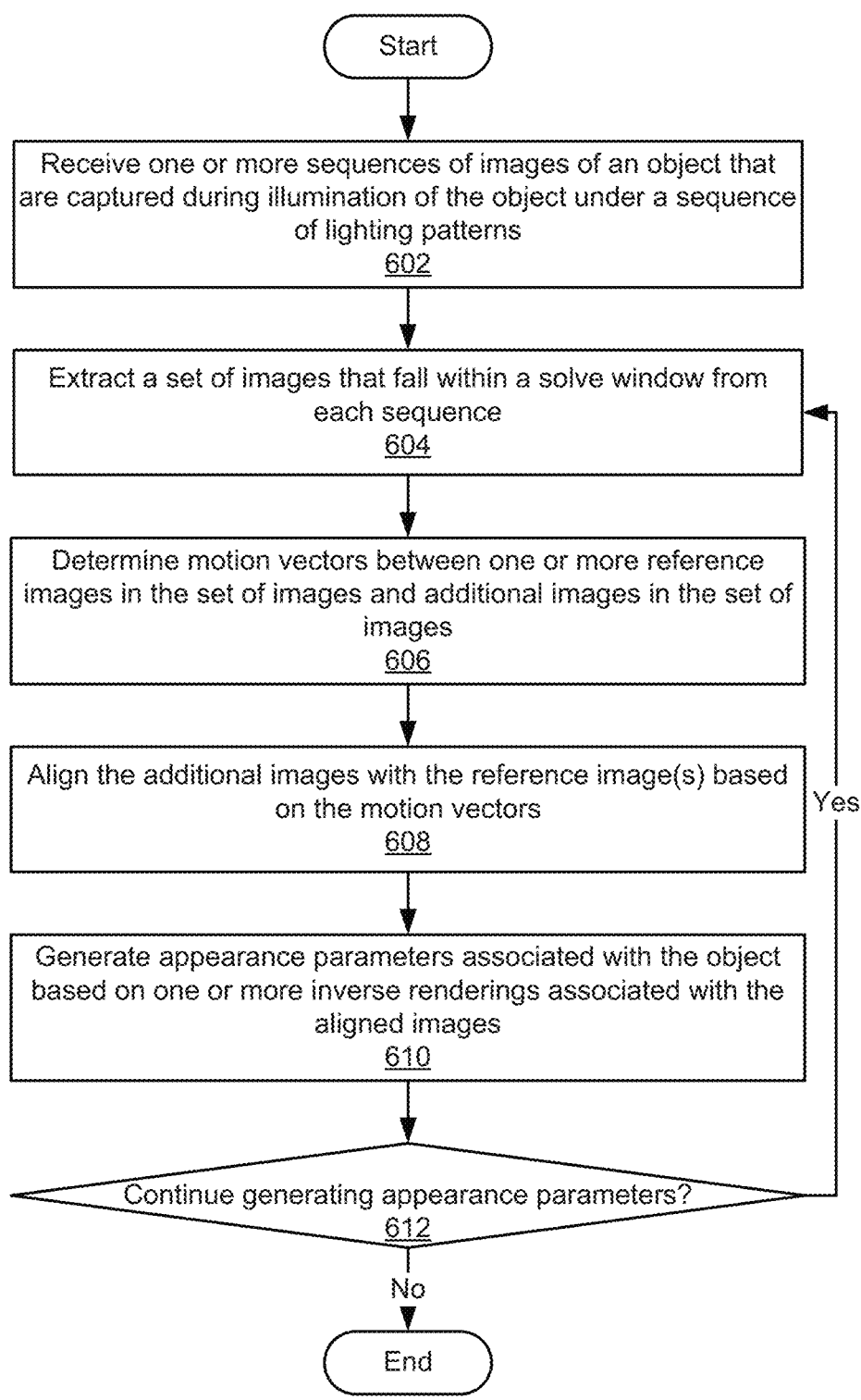
FIG. 6 is a flow diagram of method steps for performing appearance capture, given a pre-computed "best-performing" subset of lighting patterns, according to various embodiments.

FIG. 6 is a flow diagram of method steps for performing appearance capture, given a pre-computed "best-performing" subset of lighting patterns, according to various embodiments. Although the method steps are described in conjunction with the systems of FIGS. 1-4, persons skilled in the art will understand that any system configured to perform the method steps in any order falls within the scope of the present disclosure.

As shown, in step 602, appearance capture application 230 receives one or more sequences of images of an object that are captured during illumination of the object under a sequence of lighting patterns. For example, appearance capture application 230 could receive a sequence of images from each cross-polarized camera 110 and/or non-cross-polarized camera 112 in camera system 100. Images in a given sequence could be captured over short periods (e.g., microseconds or milliseconds) during illumination of the object under a sequence of lighting patterns that include full lighting from multiple light sources interleaved with one or more other lighting patterns that include illumination from a subset of the light sources. Lighting patterns in the sequence can be selected using the method steps of FIG. 5, as discussed above.

Next, in step 604, appearance capture application 230 extracts a set of images that fall within a solve window from each sequence. For example, appearance capture application 230 could extract, from each sequence, one or more images that are captured under full lighting from all available light sources, as well as one or more images that are captured under other lighting patterns identified as "best performing" by lighting optimization application 228.

In step 606, appearance capture application 230 determines motion vectors between one or more reference images in the set of images and additional images in the set of images. For example, appearance capture application 230 could generate a first set of motion vectors between a reference image that is captured under full lighting from all available light sources and one or more other images that fall within the solve window and are also captured under full lighting from all available light sources. Appearance capture application 230 could then use linear interpolation to estimate, from the first set of motion vectors, a second set of motion vectors between the reference image and remaining images that fall within the solve window and are captured under illumination from other lighting patterns.

In step 608, appearance capture application 230 aligns the additional images with the reference image(s) based on the motion vectors. For example, appearance capture application 230 could use the motion vectors to adjust the positions of pixels in each image that is not a reference image so that pixel locations in the image represent the same portions of the object as in the reference image.

In step 610, appearance capture application 230 generates appearance parameters associated with the object based on one or more inverse renderings associated with the aligned images. For example, appearance capture application 230 could use non-linear least squares optimization at one or more resolutions to determine appearance and detailed geometry maps for the object. During this process, images captured by cross-polarized cameras 110, which do not include specular highlights, can be used to determine appearance parameters other than specular intensity and specular lobe during optimization, while images captured by non-cross-polarized cameras, which do include specular highlights, can be used to determine appearance parameters including specular intensity and specular lobe during the optimization. In addition, this optimization could include inverse rendering to match rendered images of a face to the captured images of the face.

In step 612, appearance capture application 230 determines whether or not to continue generating appearance parameters. In some embodiments, appearance capture application 230 determines that additional appearance parameters are to be generated for images that fall within subsequent solve windows in the sequence(s). These additional images can be used to capture the object in various shapes and/or forms. For example, additional images in each sequence could be captured while a face is held in different facial expressions. While additional appearance parameters are to be generated, appearance capture application 230 repeats steps 604, 606, 608, and 610 to extract an additional set of images that fall within an solve window from each sequence, perform motion-based alignment of the images, and generate an additional set of appearance parameters for the object based on one or more inverse renderings associated with the aligned images. Appearance capture application 230 can then determine that appearance parameters are no longer to be generated after appearance parameters have been generated for all valid solve windows associated with the sequence(s) of images and/or another stopping condition is reached.

In sum, the disclosed techniques perform appearance capture of an object (e.g., a face) under multiple lighting conditions. Multiple images of the object are captured over a short time period (e.g., a number of milliseconds) while the object is held in a given position (e.g., a certain facial expression for the face). Each of these images is captured while the object is illuminated under a certain lighting pattern. Lighting patterns used in capturing the images are optimized based on combinations of images of the object (or a similar object) that are captured under illumination from individual light sources. An inverse rendering of the images is then used to determine appearance parameters such as a geometry, specular intensity, specular lobe, and/or diffuse albedo for the object.

One technical advantage of the disclosed techniques relative to the prior art is that appearance parameters for the object can be generated from multiple images that include different types of lighting and detail. Accordingly, the appearance parameters are more accurate and detailed than appearance and/or geometry maps generated from single-shot capture of objects. The disclosed techniques also improve the granularity and accuracy of the appearance parameters over conventional appearance capture techniques that employ strobed lighting without interleaving images captured under illumination from one lighting pattern with images captured under illumination from other lighting patterns. Another technical advantage of the disclosed techniques is the ability to estimate appearance parameters for the object as the object assumes different positions, shapes, or deformations over time. These technical advantages provide one or more technological improvements over prior art approaches.

1. In some embodiments, a computer-implemented method for performing appearance capture comprises receiving a first sequence of images captured by a first set of cameras, wherein the first sequence of images comprises a first set of images interleaved with a second set of images, and wherein the first set of images is captured during illumination of an object using a first lighting pattern and the second set of images is captured during illumination of the object using one or more lighting patterns that are different from the first lighting pattern, and generating a first set of appearance parameters associated with the object based on a first inverse rendering and the first sequence of images.

2. The computer-implemented method of clause 1, further comprising receiving a second sequence of images of the object, wherein the second sequence of images is captured by a second set of cameras that are cross-polarized with respect to a polarization of a plurality of light sources used to generate the first lighting pattern and the one or more lighting patterns, and wherein the second sequence of images is captured concurrently with the first sequence of images, and generating the first set of appearance parameters based on the first inverse rendering and the second sequence of images.

3. The computer-implemented method of clauses 1 or 2, wherein the first set of appearance parameters comprises at least one of a specular intensity, a specular albedo, a specular lobe, a normal map, a diffuse albedo, or one or more subsurface scattering parameters.

4. The computer-implemented method of any of clauses 1-3, further comprising receiving a set of images of the object, wherein the set of images is captured based on illumination of the object by individual light sources within a plurality of light sources, and determining the one or more lighting patterns based on a first relighting loss associated with a second set of appearance parameters, wherein the second set of appearance parameters is generated based on a second inverse rendering and a first combination of lighting patterns associated with the set of images.

5. The computer-implemented method of any of clauses 1-4, further comprising determining the one or more lighting patterns based on a second relighting loss associated with a third set of appearance parameters, wherein the third set of appearance parameters is generated based on a second combination of lighting patterns associated with the set of images.

6. The computer-implemented method of any of clauses 1-5, wherein the second combination of lighting patterns is selected based on the first combination of lighting patterns and the first relighting loss.

7. The computer-implemented method of any of clauses 1-6, further comprising determining a set of motion vectors between a first image in the first set of images and a second image in the first set of images, and aligning a third image that lies between the first image and the second image in the first sequence of images based on the set of motion vectors prior to generating the first set of appearance parameters based on the first image and the third image.

8. The computer-implemented method of any of clauses 1-7, wherein the first inverse rendering is performed using a first image included in the first set of images and one or more images that are included in the second set of images and adjacent to the first image in the first sequence of images.

9. The computer-implemented method of any of clauses 1-8, wherein the first lighting pattern comprises illumination from a plurality of light sources and a second lighting pattern in the one or more lighting patterns comprises illumination from a first subset of the plurality of light sources.

10. The computer-implemented method of any of clauses 1-9, wherein a third lighting pattern in the one or more lighting patterns comprises illumination from a second subset of the plurality of light sources, wherein the second subset of the plurality of light sources is different from the first subset of the plurality of light sources.

11. In some embodiments, one or more non-transitory computer readable media store instructions that, when executed by one or more processors, cause the one or more processors to perform the steps of receiving a first set of images of a first object, wherein the first set of images is captured based on illumination of the first object by individual light sources within a plurality of light sources, generating a plurality of lighting patterns based on the first set of images, wherein each lighting pattern in the plurality of lighting patterns represents illumination of the first object under a different combination of light sources included in the plurality of light sources, determining a first set of lighting patterns based on a first relighting loss associated with a first set of appearance parameters for the first object, wherein the first set of appearance parameters is generated based on a first set of lighting patterns from the plurality of lighting patterns, and generating a lighting pattern combination for an object type associated with the first object based on the first set of lighting patterns.

12. The one or more non-transitory computer readable media of clause 11, wherein the instructions further cause the one or more processors to perform the steps of determining a second set of lighting patterns based on a second relighting loss associated with a second set of appearance parameters for a second object, wherein the second set of appearance parameters is generated based on illumination of the second object under the set of lighting patterns, and generating the lighting pattern combination for the object type associated with the first object and the second object based on the second set of lighting patterns.

13. The one or more non-transitory computer readable media of clauses 11 or 12, wherein the lighting pattern combination is generated based on an aggregation of the first set of lighting patterns and the second set of lighting patterns.

14. The one or more non-transitory computer readable media of any of clauses 11-13, wherein the instructions further cause the one or more processors to perform the steps of determining a second relighting loss associated with a second set of appearance parameters for the first object, wherein the second set of appearance parameters is generated based on a second set of lighting patterns from the plurality of lighting patterns, and selecting the first set of lighting patterns based on the second relighting loss and the second set of lighting patterns.

15. The one or more non-transitory computer readable media of any of clauses 11-14, wherein selecting the first set of lighting patterns comprises generating a first lighting pattern in the first set of lighting patterns based on a subset of light sources included in a second lighting pattern from the second set of lighting patterns.

16. The one or more non-transitory computer readable media of any of clauses 11-15, wherein generating the lighting pattern combination comprises adding a first lighting pattern to the lighting pattern combination based on the first relighting loss, and adding a second lighting pattern to the lighting pattern combination based on a second relighting loss associated with a second set of appearance parameters for the first object, wherein the second set of appearance parameters is generated based on the first lighting pattern and the second lighting pattern.

17. The one or more non-transitory computer readable media of any of clauses 11-16, wherein the instructions further cause the one or more processors to perform the steps of receiving a sequence of images of a second object, wherein the sequence of images comprises a second set of images interleaved with a third set of images, and wherein the second set of images is captured based on illumination of the second object using a first lighting pattern in the first set of lighting patterns and the third set of images is captured based on illumination of the second object using one or more lighting patterns that are in the first set of lighting patterns and different from the first lighting pattern, and generating a second set of appearance parameters associated with the second object based on a first inverse rendering associated with the sequence of images.

18. The one or more non-transitory computer readable media of any of clauses 11-17, wherein the sequence of images comprises multiple consecutive images captured under the first lighting pattern followed by an image captured under a second lighting pattern in the one or more lighting patterns, wherein the first lighting pattern comprises illumination from the plurality of light sources, and wherein the second lighting pattern comprises illumination from a first subset of the plurality of light sources.

19. The one or more non-transitory computer readable media of any of clauses 11-18, wherein the sequence of images comprises multiple consecutive images captured under the one or more lighting patterns followed by an image captured under the first lighting pattern, wherein the first lighting pattern comprises illumination from the plurality of light sources, and wherein the one or more lighting patterns comprise illumination from one or more subsets of the plurality of light sources.

20. In some embodiments, a system comprises a memory that stores instructions, and a processor that is coupled to the memory and, when executing the instructions, is configured to receive a first sequence of images captured by a set of cameras, wherein the first sequence of images comprises a first set of images interleaved with a second set of images, and wherein the first set of images is captured based on illumination of an object using a first lighting pattern and the second set of images is captured based on illumination of the object using one or more lighting patterns that are different from the first lighting pattern, and generate a first set of appearance parameters associated with the object based on a first inverse rendering associated with the first sequence of images.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing appearance capture, the method comprising:
   determining one or more lighting patterns from a plurality of lighting patterns based on a comparison of one or more relighting losses associated with the plurality of lighting patterns;
   determining a first sequence of images captured by a first set of cameras, wherein the first sequence of images comprises a first set of images interleaved with a second set of images, and wherein the first set of images is captured during illumination of an object using a first lighting pattern and the second set of images is captured during illumination of the object using the one or more lighting patterns that are different from the first lighting pattern; and generating a first set of appearance parameters associated with the object based on a first inverse rendering and the first sequence of images.

2. The computer-implemented method of claim 1, further comprising:

receiving a second sequence of images of the object, wherein the second sequence of images is captured by a second set of cameras that are cross-polarized with respect to a polarization of a plurality of light sources used to generate the first lighting pattern and the one or more lighting patterns, and wherein the second sequence of images is captured concurrently with the first sequence of images; and generating the first set of appearance parameters based on the first inverse rendering and further based on the second sequence of images.

3. The computer-implemented method of claim 1, wherein the first set of appearance parameters comprises at least one of a specular intensity, a specular albedo, a specular lobe, a normal map, a diffuse albedo, or one or more subsurface scattering parameters.

4. The computer-implemented method of claim 1, further comprising:

receiving a set of images of the object, wherein the set of images is captured based on illumination of the object by individual light sources within a plurality of light sources; and determining the one or more lighting patterns based on a first relighting loss associated with a second set of appearance parameters, wherein the second set of appearance parameters is generated based on a second inverse rendering and a first combination of lighting patterns associated with the set of images.

5. The computer-implemented method of claim 4, further comprising determining the one or more lighting patterns based on a second relighting loss associated with a third set of appearance parameters, wherein the third set of appearance parameters is generated based on a second combination of lighting patterns associated with the set of images.

6. The computer-implemented method of claim 5, wherein the second combination of lighting patterns is selected based on the first combination of lighting patterns and the first relighting loss.

7. The computer-implemented method of claim 1, further comprising:

determining a set of motion vectors between a first image in the first set of images and a second image in the first set of images; and aligning a third image that lies between the first image and the second image in the first sequence of images based on the set of motion vectors, wherein the first set of appearance parameters are generated further based on the third image.

8. The computer-implemented method of claim 1, wherein the first inverse rendering is performed using a first image included in the first set of images and one or more images that are included in the second set of images and adjacent to the first image in the first sequence of images.

9. The computer-implemented method of claim 1, wherein the first lighting pattern comprises illumination from a plurality of light sources and a second lighting pattern in the one or more lighting patterns comprises illumination from a first subset of the plurality of light sources.

10. The computer-implemented method of claim 9, wherein a third lighting pattern in the one or more lighting patterns comprises illumination from a second subset of the plurality of light sources, wherein the second subset of the plurality of light sources is different from the first subset of the plurality of light sources.

11. One or more non-transitory computer readable media storing instructions that, when executed by one or more processors, cause the one or more processors to perform the steps of:

receiving a plurality of lighting patterns based on a first set of images, wherein each lighting pattern in the plurality of lighting patterns represents illumination of a first object under a different combination of light sources included in a plurality of light sources, wherein each lighting pattern in the plurality of lighting patterns is associated with a relighting loss, wherein a first relighting loss associated with a first lighting pattern in the plurality of lighting patterns is determined based on a first set of appearance parameters for the first object generated using at least the first lighting pattern;

determining a first set of lighting patterns from the plurality of lighting patterns based on a comparison of relighting losses associated with the plurality of lighting patterns; and generating a lighting pattern combination for an object type associated with the first object based on the first set of lighting patterns.

12. The one or more non-transitory computer readable media of claim 11, wherein the instructions further cause the one or more processors to perform the steps of:

determining a second set of lighting patterns based on a second relighting loss associated with a second set of appearance parameters for a second object, wherein the second set of appearance parameters is generated based on illumination of the second object under the second set of lighting patterns; and generating the lighting pattern combination further based on the second set of lighting patterns, wherein the lighting pattern is further associated with the second object.

13. The one or more non-transitory computer readable media of claim 12, wherein the lighting pattern combination is generated based on an aggregation of the first set of lighting patterns and the second set of lighting patterns.

14. The one or more non-transitory computer readable media of claim 11, wherein the instructions further cause the one or more processors to perform the steps of:

determining a second relighting loss associated with a second set of appearance parameters for the first object, wherein the second set of appearance parameters is generated based on a second set of lighting patterns from the plurality of lighting patterns; and selecting the first set of lighting patterns based on the second relighting loss and the second set of lighting patterns.

15. The one or more non-transitory computer readable media of claim 14, wherein selecting the first set of lighting patterns comprises generating a first lighting pattern in the first set of lighting patterns based on a subset of light sources included in a second lighting pattern from the second set of lighting patterns.

16. The one or more non-transitory computer readable media of claim 11, wherein generating the lighting pattern combination comprises:
   adding the first lighting pattern to the lighting pattern combination based on the first relighting loss; and
   adding a second lighting pattern to the lighting pattern combination based on a second relighting loss associated with a second set of appearance parameters for the first object, wherein the second set of appearance parameters is generated based on the first lighting pattern and the second lighting pattern.

17. The one or more non-transitory computer readable media of claim 11, wherein the instructions further cause the one or more processors to perform the steps of:
   receiving a sequence of images of a second object, wherein the sequence of images comprises a second set of images interleaved with a third set of images, and wherein the second set of images is captured based on illumination of the second object using the first lighting pattern in the first set of lighting patterns and the third set of images is captured based on illumination of the second object using one or more lighting patterns that are in the first set of lighting patterns and different from the first lighting pattern; and
   generating a second set of appearance parameters associated with the second object based on a first inverse rendering associated with the sequence of images.

18. The one or more non-transitory computer readable media of claim 17, wherein the sequence of images comprises multiple consecutive images captured under the first lighting pattern followed by an image captured under a second lighting pattern in the one or more lighting patterns, wherein the first lighting pattern comprises illumination from the plurality of light sources, and wherein the second lighting pattern comprises illumination from a first subset of the plurality of light sources.

19. The one or more non-transitory computer readable media of claim 17, wherein the sequence of images comprises multiple consecutive images captured under the one or more lighting patterns followed by an image captured under the first lighting pattern, wherein the first lighting pattern comprises illumination from the plurality of light sources, and wherein the one or more lighting patterns comprise illumination from one or more subsets of the plurality of light sources.

20. A system, comprising:
   a memory that stores instructions, and
   a processor that is coupled to the memory and, when executing the instructions, is configured to:
      determining one or more lighting patterns from a plurality of lighting patterns based on one or more relighting losses associated with the plurality of lighting patterns;
      determining a first sequence of images captured by a set of cameras, wherein the first sequence of images comprises a first set of images interleaved with a second set of images, and wherein the first set of images is captured based on illumination of an object using a first lighting pattern and the second set of images is captured based on illumination of the object using the one or more lighting patterns that are different from the first lighting pattern; and
      generate a first set of appearance parameters associated with the object based on a first inverse rendering associated with the first sequence of images.

* * * * *

UNITED STATES PATENT AND TRADEMARK OFFICE
CERTIFICATE OF CORRECTION

PATENT NO. : 12,086,927 B2
APPLICATION NO. : 17/506520
DATED : September 10, 2024
INVENTOR(S) : Paulo Fabiano Urnau Gotardo et al.

It is certified that error appears in the above-identified patent and that said Letters Patent is hereby corrected as shown below:

In the Specification

In Column 16, Line 19, delete "$\tau_b$," and insert -- $\rho_b$, --.

Signed and Sealed this
Twelfth Day of November, 2024

Katherine Kelly Vidal
*Director of the United States Patent and Trademark Office*